United States Patent
Fujiwara et al.

(10) Patent No.: US 7,538,987 B2
(45) Date of Patent: May 26, 2009

(54) CPP SPIN-VALVE ELEMENT

(75) Inventors: Hideo Fujiwara, Tuscaloosa, AL (US); Keiichi Nagasaka, Kawasaki (JP); Tong Zhao, Milpitas, CA (US); William H. Butler, Tuscaloosa, AL (US); Julian Velev, Tuscaloosa, AL (US); Amrit Bandyopadhyay, Tuscaloosa, AL (US)

(73) Assignees: University of Alabama, Tuscaloosa, AL (US); Fujitsu, Ltd., Kawasaki-shi (JP)

( * ) Notice: Subject to any disclaimer, the term of this patent is extended or adjusted under 35 U.S.C. 154(b) by 0 days.

(21) Appl. No.: 10/611,978

(22) Filed: Jul. 3, 2003

(65) Prior Publication Data

US 2005/0002126 A1    Jan. 6, 2005

(51) Int. Cl.
    *G11B 5/39*    (2006.01)
(52) U.S. Cl. .................................. 360/324.1
(58) Field of Classification Search .............. 360/324.1, 360/324.12, 324.2, 31, 322, 324
    See application file for complete search history.

(56) References Cited

U.S. PATENT DOCUMENTS

| | | | | |
|---|---|---|---|---|
| 5,715,121 A | * | 2/1998 | Sakakima et al. | 360/324.2 |
| 5,818,323 A | * | 10/1998 | Maeda et al. | 338/32 R |
| 5,835,314 A | * | 11/1998 | Moodera et al. | 360/324.2 |
| 6,016,241 A | * | 1/2000 | Coffey et al. | 360/324 |
| 6,560,077 B2 | * | 5/2003 | Fujiwara et al. | 360/324.1 |
| 6,686,068 B2 | * | 2/2004 | Carey et al. | 428/811.3 |
| 6,707,649 B2 | * | 3/2004 | Hasegawa et al. | 360/324.12 |
| 6,819,532 B2 | * | 11/2004 | Kamijo | 360/324.11 |
| 2002/0114974 A1 | | 8/2002 | Carey et al. | |
| 2003/0123200 A1 | * | 7/2003 | Nagasaka et al. | 360/324.1 |
| 2003/0197982 A1 | * | 10/2003 | Funayama et al. | 360/321 |
| 2004/0042127 A1 | * | 3/2004 | Hoshiya et al. | 360/322 |

OTHER PUBLICATIONS

Nagasaka et al, "Giant magnetoresistance properties," Journal of the Magnetics Society of Japan, vol. 25, No. 4, Part. 2, pp. 807-810, (2001).*

* cited by examiner

*Primary Examiner*—Tianjie Chen
(74) *Attorney, Agent, or Firm*—Oblon, Spivak, McClelland, Maier & Neustadt, P.C.

(57) ABSTRACT

A CPP spin-valve element formed on a substrate including a free layer structure including at least one ferromagnetic layer and a pinned layer structure including at least one ferromagnetic layer. The free layer is magnetically softer than the pinned layer. A thin non-magnetic spacer layer structure configured to separate the free layer and the pinned layer is provided in order to prevent a magnetic coupling between the free and pinned layer structures, and to allow an electric current to go there through. At least two current-confining (CC) layer structures including at least two parts having significantly different current conductivities are incorporated therein.

13 Claims, 20 Drawing Sheets

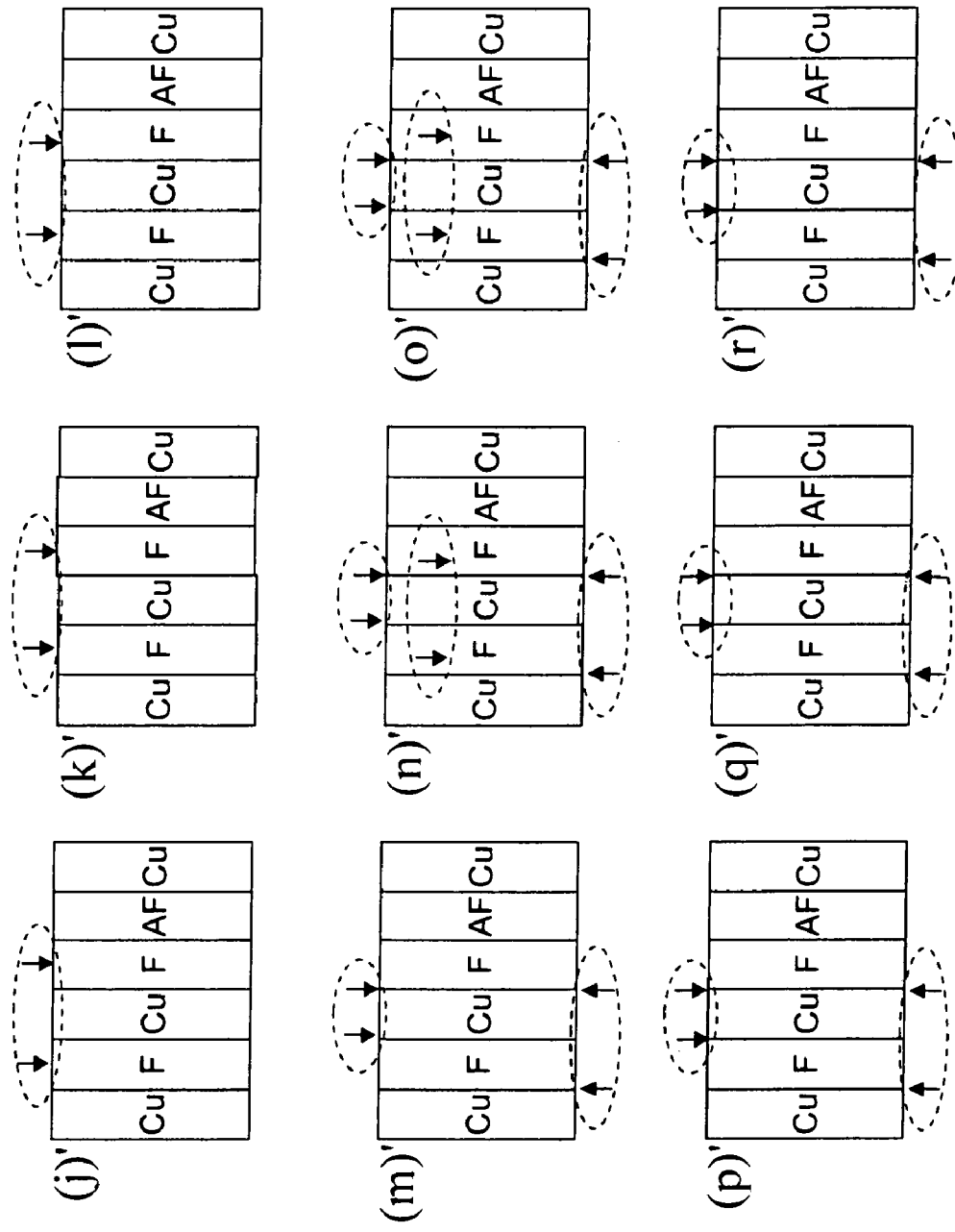

CPP SPIN-VALVE ELEMENT

BACKGROUND OF THE INVENTION

1. Field of the Invention

This invention, in general, relates to the field of magnetoresistive spin-valve (SV) elements. More specifically, the present invention relates to current perpendicular-to-the-plane (CPP) spin-valve device configurations, applicable as a magnetic non-volatile mass-memory called (MRAM) and/or as a magnetic transducer or "head" for reading information signals recorded on a magnetic medium.

2. Description of Prior Art

The related art, e.g., U.S. Pat. No. 5,159,513, discloses a magnetic transducer which is sometimes referred to as a spin-valve magnetoresistive sensor. A spin-valve element includes at least two ferromagnetic layers having different magnetic field sensitivity. The ferromagnetic layer having the higher sensitivity is referred to as the "free layer" and the other ferromagnetic layer is referred to as the "pinned layer." The resistance of the spin valve element is a function of the angle between the magnetizations of the two layers (cosine of the angle) and is independent of the current direction with respect to the magnetization directions (which is traditionally called the giant magnetoresistive effect (GMR)).

In MRAM's, binary information is stored either by the direction of the magnetization in the free layer or in the pinned layer. The stored information is read out by applying a field and sensing the sign of the change of the resistance of the spin-valve element. See, for instance, "Characteristics of AP Bias in Spin Valve Memory Elements," J. Zhu and Y. Zheng, IEEE Trans. Magn. Vol. 34, 1063-1065 (1998); "Pseudo Spin Valve MRAM Cells with Sub-Micrometer Critical Dimension," B. A. Everitt et al, IEEE Trans. Magn. Vol. 34, 1060-1062 (1998), which is incorporated herein by reference. Binary information can also be read by directly sensing the resistance of the spin-valve element. A spin-valve element can also be applied to a magnetic field sensor such as a read head in magnetic recording by detecting a magnetic field through the resistance change of the element. It has been shown that a spin-valve head is capable of reading data from a magnetic surface at great linear densities.

The GMR effect is larger when measured with a current perpendicular to the layer structure than when measured with a current in a plane direction. See, for example, "Perpendicular Giant Magnetoresistance of Microstructured Fe/Cr Magnetic multilayers from 4.2 to 300 K," M. A, M. Gijs, S. K. J. Lenczovski and J. B. Giesbers, Physical Review Letters, Vol. 70, 3343-3346 (1993), both of which are incorporated herein by reference. The former is called CPP (current perpendicular-to-the-plane) and the latter, CIP (current-in-plane). Therefore, it is desirable to make use of CPP rather than CIP if the circumstances allow. However, the drawback in the ordinary CPP structure is the fact that only a very low resistance change is obtainable compared to the CIP structure. Consequently, the very low resistance change makes it necessary to apply a very large current to obtain a reasonable output signal level.

U.S. Pat. No. 6,560,077 discloses a confined current path (CCP) CPP spin-valve device including a spin-valve element including a substrate and a layered structure formed on the substrate. The layered structure has a first thin film layer of ferromagnetic material and a second thin film layer of ferromagnetic material. The first thin film layer and the second thin film layer are separated by a thin non-magnetic layer structure. One of the first and second thin film layers is a free layer and the other of the first and the second thin film layers is a pinned layer. The non-magnetic layer structure has a current confining (CC) layer structure having at least one CCP and means for producing a current flow through the spin-valve element between the free and the pinned layer through the plurality of confined current paths. At least one confined current path of the plurality of confined current paths is formed within every flux path of a width of the exchange length of the free layer except at the edge of the free layer.

FIG. 1 depicts the CPP spin-valve element disclosed by U.S. Pat. No. 6,560,077. The spin-valve element includes magnetic layer structures 11 and 12, either one of which is a free layer structure and the other is a pinned layer structure with a non-magnetic conducting spacer layer structure 13 and a CC-layer structure 14 in between. Each layer structure has a width w and a height h. The CC-layer structure confines the current path going from one side of the CC-layer structure to the other side of the CC-layer structure in order to increase the total resistance of the spin-valve element. This enables a high output voltage when a reasonable amount of current is applied to the spin-valve element perpendicular to the element. The CC-layer structure 14 includes an insulator with a conducting part or a plurality of conducting parts. In case the conducting part is of a hole, the magnetic layer structure 11 and the conducting spacer layer structure 13 are directly connected to each other through the hole(s). The CC-layer structure 14 can be of a mosaic structure composed of at least two parts having significantly different conductivities. The spin-valve element is connected to a current source which applies a current from one side to the other through the leads 15 and 15'. The leads may be either of a magnetic or of a nonmagnetic material. When applied to magnetic recording read heads it is especially beneficial for avoiding the additional magnetic noise if the distance between the adjacent conducting parts is made smaller than the, so called, "exchange length" of the free layer material, which is usually in the range of between several tens of nanometers to several hundred nanometers.

U.S. Pat. No. 5,715,121 discloses a CPP spin-valve element which comprises a plurality of magnetic films and one or more nonmagnetic films. The magnetic films and the one or more nonmagnetic films are layered so that each nonmagnetic film is arranged between a pair of the magnetic films. The nonmagnetic film includes an electrical insulator film and at least one electrical conductor positioned in the electrical insulator film in order to confine the current path to a smaller cross-sectional area than that of the element. Hence, the spin valve element provides a large resistance and a resistance change which renders it practicable.

FIG. 2 depicts the CPP spin-valve element disclosed by U.S. Pat. No. 5,715,121. The spin valve element includes magnetic layer structures 21 and 22, either one of which is a free layer structure and the other is a pinned layer structure with a non-magnetic CC-layer structure 24 in between. The CC-layer structure 24 can be of a mosaic structure including at least two parts having significantly different conductivities. The spin-valve element is connected to a current source in order to apply a current from one side to the other through the leads 25 and 25', which may be of a magnetic or of a non-magnetic material, each layer structure having a width w and a height h.

Both U.S. Pat. Nos. 5,715,121 and 6,560,077 are incorporated herein by reference. See also "High-resolution focused ion beams", by Jon Orloff, Review of Scientific Instruments, Vol. 64, 1105-1130 (1993), which is incorporated herein by reference.

SUMMARY OF THE INVENTION

An objective of the present invention is to provide a spin-valve element of a CPP structure that has a high resistance and which generates a high output signal with a low current.

A further objective of the present invention is to provide a way for obtaining substantially higher output and better performances by applying a lower current than that obtained by related prior art devices.

In accordance with those objectives, the present invention provides a CPP spin-valve element including a layered structure formed on a substrate including first and second thin ferromagnetic layer structures. A free layer structure (one of the first and second thin ferromagnetic layer structures) is made magnetically softer than the pinned layer structure (the other ferromagnetic layer structure), and the two layers are separated by a thin non-magnetic spacer layer which prevents a substantial magnetic coupling between the free and pinned layer structures. The spacer layer also allows an electric current to go through. At least two CC-layer structures including at least two parts having significantly different current conductivities are incorporated therein.

More specifically, a spin-valve element including a layered structure is formed on a substrate including a free layer structure and a pinned layer structure. The free layer structure and the pinned layer structure are separated by a thin non-magnetic layer structure. The thin non-magnetic layer structure is either a conducting layer or a CC-layer structure, prevents a substantial magnetic coupling between the free and pinned layer structures, and allows an electric current to go through.

In the case where a conducting layer structure is used, one CC-layer structure is located within or in the vicinity of the free layer structure and at least one other CC-layer structure is located within or in the vicinity of the pinned layer structure. In the case where a CC-layer structure is used, at least one more CC-layer structure is added within or in the vicinity of the free layer structure or within or in the vicinity of the pinned layer structure and/or the size of the confined current paths in the CC-layer structure(s) is greater than a certain critical value. Further improvement in the performance can also be attained for the former spin-valve element by controlling the size of the confined current paths in the CC-layer structure(s).

In short, the present invention provides CCP-CPP spin-valve element wherein the structure and/or the location of CC-layers is/are designed to realize effective current confinement.

BRIEF DESCRIPTION OF THE DRAWINGS

FIGS. 5(a)' to 5(r)' are corresponding cross-sectional views of the contour maps of the spin-valve structures illustrated in FIGS. 5(a) to 5(r).

DESCRIPTION OF THE PREFERRED EMBODIMENTS

Figure 1:
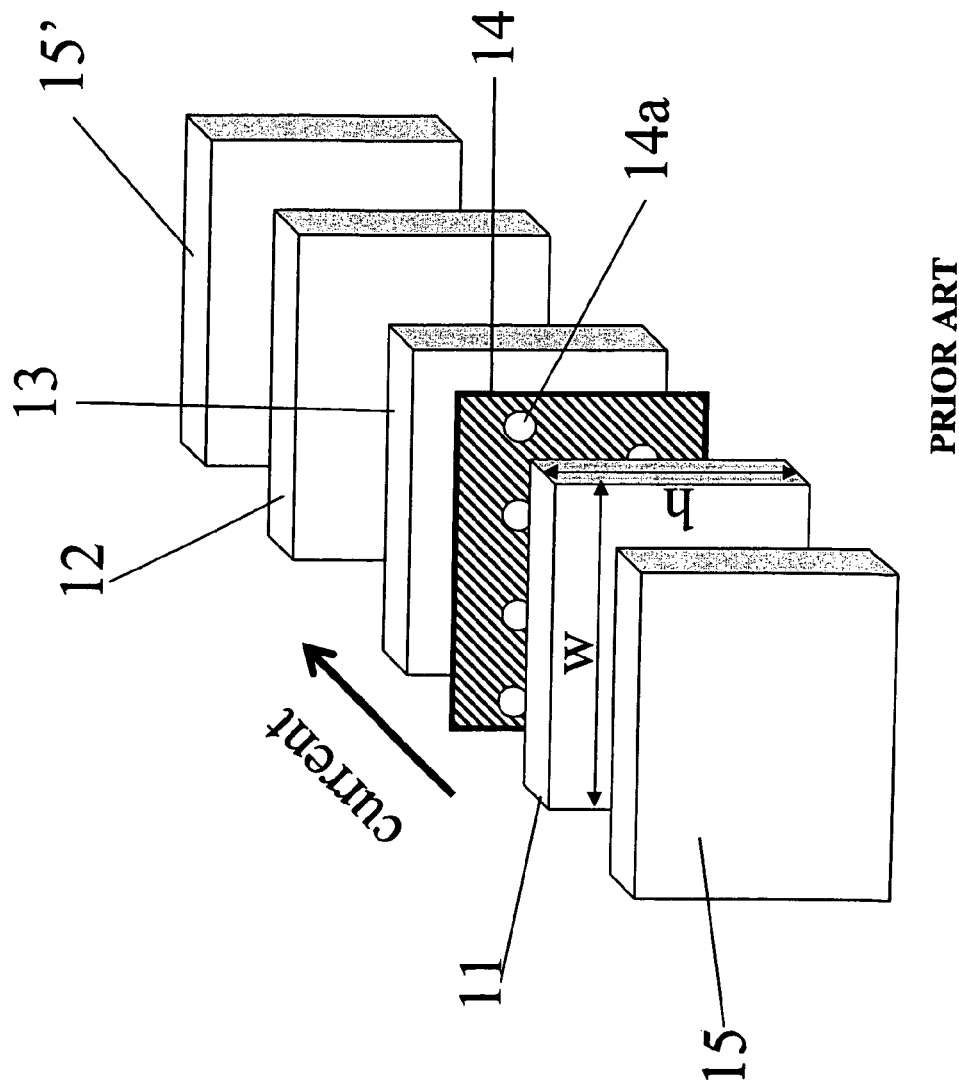
FIG. 1 is a schematic view of the structure of a CPP spin-valve element of the related prior art.
Figure 2:
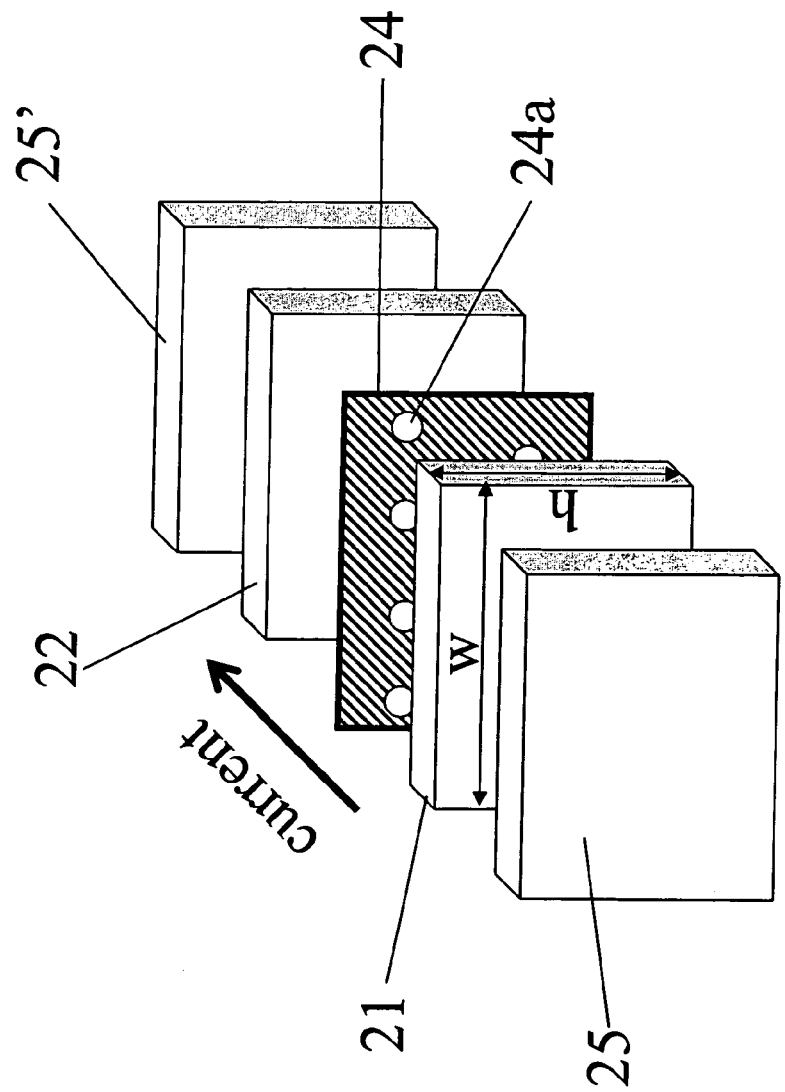
FIG. 2 is a schematic view of the structure of another type of CPP spin-valve element of the related prior art.

FIGS. 3(a), 3(b), and 3(c) illustrate the contour mappings, calculated by simulation, of the total resistance $R_P$ for the parallel configuration (the configuration in which the magnetizations of the free and pinned layer structures are parallel to each other), the difference between the resistances between the parallel and anti-parallel configurations (i.e., the magnetoresistance ΔR), and the GMR ratio as a function of the location of the two CC-layers, CC-layer 1 and CC-layer 2. The simulation was performed by using a resistor network model. An example of the resistor network model is shown schematically in FIG. 4.

The plane of the spin-valve element was set in the x-z plane. Here 41 is a ferromagnetic free layer. 42a and 42b are a ferromagnetic layer and an antiferromagnetic layer, respectively, including a pinned layer structure and a pinned layer including a pinning layer, respectively. 43 is a non-magnetic conducting spacer layer. 44 and 44' are CC-layers each having a slit 44a (44a') wherein the same material which forms the layer in which the CC-layer is inserted is filled. 45 and 45' are lead layers comprised of Cu, respectively. The current was applied in the y direction. Each layer was divided into small cells and each cell layer was numbered in ascending order in the y-direction.

As a typical example, the thickness of each layer was chosen as Cu(10 nm)/ferromagnetic layer (4.5 nm)/Cu(2 nm)/ferromagnetic layer (4.5 nm)/antiferromagnetic layer (10 nm)/Cu(10 nm). The two magnetic layers were assumed to have the same thicknesses. Two CC-layers of a 0.5 nm thick insulator with a slit having a width of 0.5 nm running from the bottom to the top in the height direction were inserted by replacing a part of the above structure leaving the same materials in the slits. The element size was assumed to be 40 nm×40 nm. The correspondence between the location numbers in the y direction and the layer materials are listed in Table 1. In the simulation, Mott's two-current model for the electrical conductivity in metals was adopted. See N. F. Mott, "The Resistance and Thermoelectric Properties of the Transition Metals," Proceedings of the Royal Security of London, Series A. Vol. 156, 368-382 (1936), and S. F. Lee, W. P. Pratt, Jr., Q. Yang, P. Holody, R. Loloee, P. A. Schroeder and J. Bass, "Two-channel analysis of CPP-MR data for Ag/Co and AgSn/ Co multilayers". J. Magn. Magn. Mater., Vol. 118, L1-L5 (1993). The numbers on the horizontal and vertical axes in FIG. 3(a), 3(b), and 3(c) indicate the location of the CC-layers 1 and 2, respectively. The symbols Cu, F, and AF on the right side and above of the mappings denote the locations of the copper, ferromagnetic, and antiferromagnetic layers, respectively.

In order to make the calculations for the simulation, the parameters shown in Table 2 were assumed. Here, the first ferromagnetic layer corresponds to the free layer and the second ferromagnetic layer corresponds to the pinned layer. The parameters for the Cu layer, the ferromagnetic layers, and the interface layers between the ferromagnetic and Cu layers were chosen from reported experimental results. See H. Oshima, K. Nagasaka, Y. Seyama, Y. Shimizu, and A. Tanaka, "Spin filtering effect at interfaces in perpendicular spin valves", Phys. Rev. B 66, 140404 (2002), which is incorporated herein by reference. The antiferromagnetic layers were chosen assuming that the antiferromagnetic layer was made of Mn alloys. These parameters gave the GMR ratio of about 0.05 (5%) when no CC-layers were inserted. The element size was assumed to be 40 nm squared. In the simulation, each layer was divided into cells of 0.5 nm×0.5 nm in the thickness and width directions.

TABLE 1

The material of the layer structure used for the GMR ratio calculation at each location number.

| Location number | Materials |
| --- | --- |
| 1-20 | Cu |
| 21 | interface |
| 22-30 | ferromagnet |
| 31 | interface |
| 32-35 | Cu |
| 36 | interface |
| 37-45 | ferromagnet |
| 46 | interface |
| 47-66 | antiferromagnet |
| 67 | interface |
| 68-87 | Cu |

TABLE 2

The resistivity of each layer is shown. For ferromagnetic layers and interface layers, two different resistivities were assumed, one for the low resistivity channel and the other for the high resistivity channel in order to use the Valet's two channel model. See the Oshima et al. publication and T. Valet and A. Fert, "Theory of the perpendicular magnetoresistance in magnetic multilayers", Phys. Rev. B 48, 7099-7113 (1993). The Valet et al. publication is incorporated herein by reference. These parameters give the GMR ratio of about 5% without insertion of any CC-layers.

| Layers | Low resistivity channel | High resistivity channel |
| --- | --- | --- |
| Cu layers | 8.4 μΩcm | 8.4 μΩcm |
| Ferromagnetic layers | 32 μΩcm | 120 μΩcm |

TABLE 2-continued

The resistivity of each layer is shown. For ferromagnetic layers and interface layers, two different resistivities were assumed, one for the low resistivity channel and the other for the high resistivity channel in order to use the Valet's two channel model. See the Oshima et al. publication and T. Valet and A. Fert, "Theory of the perpendicular magnetoresistance in magnetic multilayers", Phys. Rev. B 48, 7099-7113 (1993). The Valet et al. publication is incorporated herein by reference. These parameters give the GMR ratio of about 5% without insertion of any CC-layers.

| Layers | Low resistivity channel | High resistivity channel |
| --- | --- | --- |
| Antiferromagnetic layer | 80 μΩcm | 80 μΩcm |
| Interface layers (FM/Cu) | 300 μΩcm | 610 μΩcm |
| Interface layers (others) | 500 μΩcm | 500 μΩcm |

The resistivity of each layer is shown. For ferromagnetic layers and interface layers, two different resistivities were assumed, one for the low resistivity channel and the other for the high resistivity channel in order to use the Valet's two channel model.
See the Oshima et al. publication and T. Valet and A. Fert, "Theory of the perpendicular magnetoresistance in magnetic multilayers", Phys. Rev. B 48, 7099-7113 (1993).
The Valet et al. publication is incorporated herein by reference. These parameters give the GMR ratio of about 5% without insertion of any CC-layers.

Here, the bulk spin asymmetry coefficient, $\beta$, of 0.58 and the interface spin asymmetry coefficient, $\gamma$, of 0.34 were assumed in accordance with the experimental results of Oshima et al., with $\beta$ denoting $1-2\rho/\rho_H=2\rho/\rho_L-1$, where $\rho$ is the resistivity of said ferromagnetic layer material, $\rho_L$ is the resistivity of the ferromagnetic layer material for the low resistivity channel, $\rho_H$ is the resistivity of the ferromagnetic layer material for the high resistivity channel, and $\gamma$ denoting $1-2RA/R_HA=2RA/R_LA-1$, where RA is the resistance area product of the interface between the ferromagnetic layer and the Cu layer, $R_LA$ is the resistance area product of the interface between the ferromagnetic layer and the Cu layer for the low resistivity channel, and $R_HA$ is the resistance area product of the interface between the ferromagnetic layer and the Cu layer for the high resistivity channel. As for those formulas, for instance, see the Valet et al. publication. It is clearly seen in FIGS. 3 (a) to 3(c) that the total resistance $R_p$, the magnetoresistance $\Delta R$, and the GMR ratio are enhanced substantially when each of the two CC-layers is located on a different side of the center of the conducting spacer (in this example the Cu-layer between the two ferromagnetic layers, one corresponding to a free layer and the other to a pinned layer). This is especially true when each of the two CC-layers is within and/or in the vicinity of the ferromagnetic layers, and more prominently when they are within the ferromagnetic layers. This effect is remarkable compared to the case where only one CC-layer is inserted, which is represented by the results plotted along the diagonal d in the figures. The features of the mappings shown above have been confirmed to be the features obtained not only for the particular parameters used in the above simulation, but also for other various combinations of parameters as will be described by the following.

Figure 3:
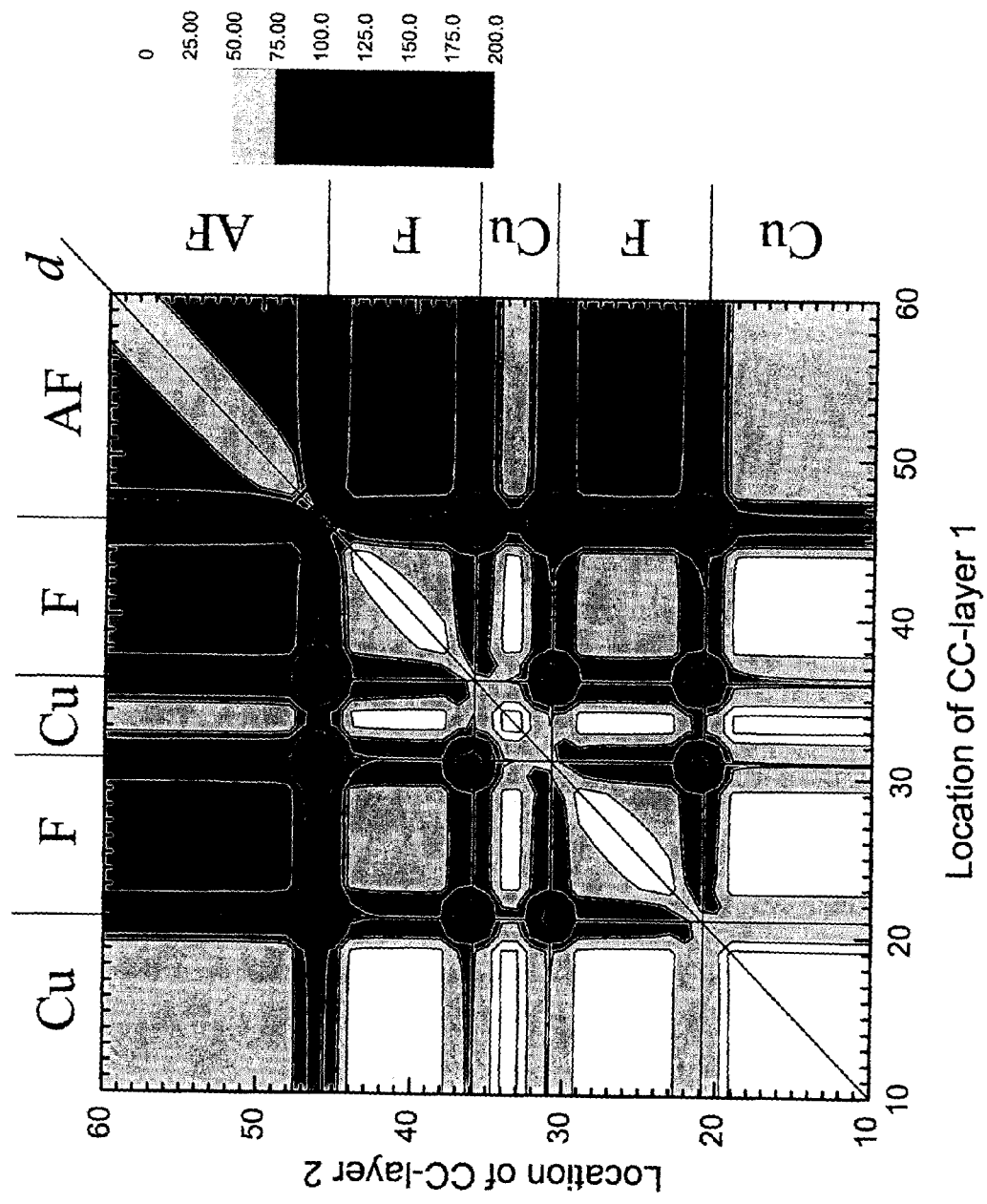
FIGS. 3(a) to 3(c) are typical contour diagrams showing the dependence of the resistance, resistance change ΔR, and GMR ratio on the location of the two CC-layers of a spin-valve structure of the present invention with a set of parameters.
Figure 3:
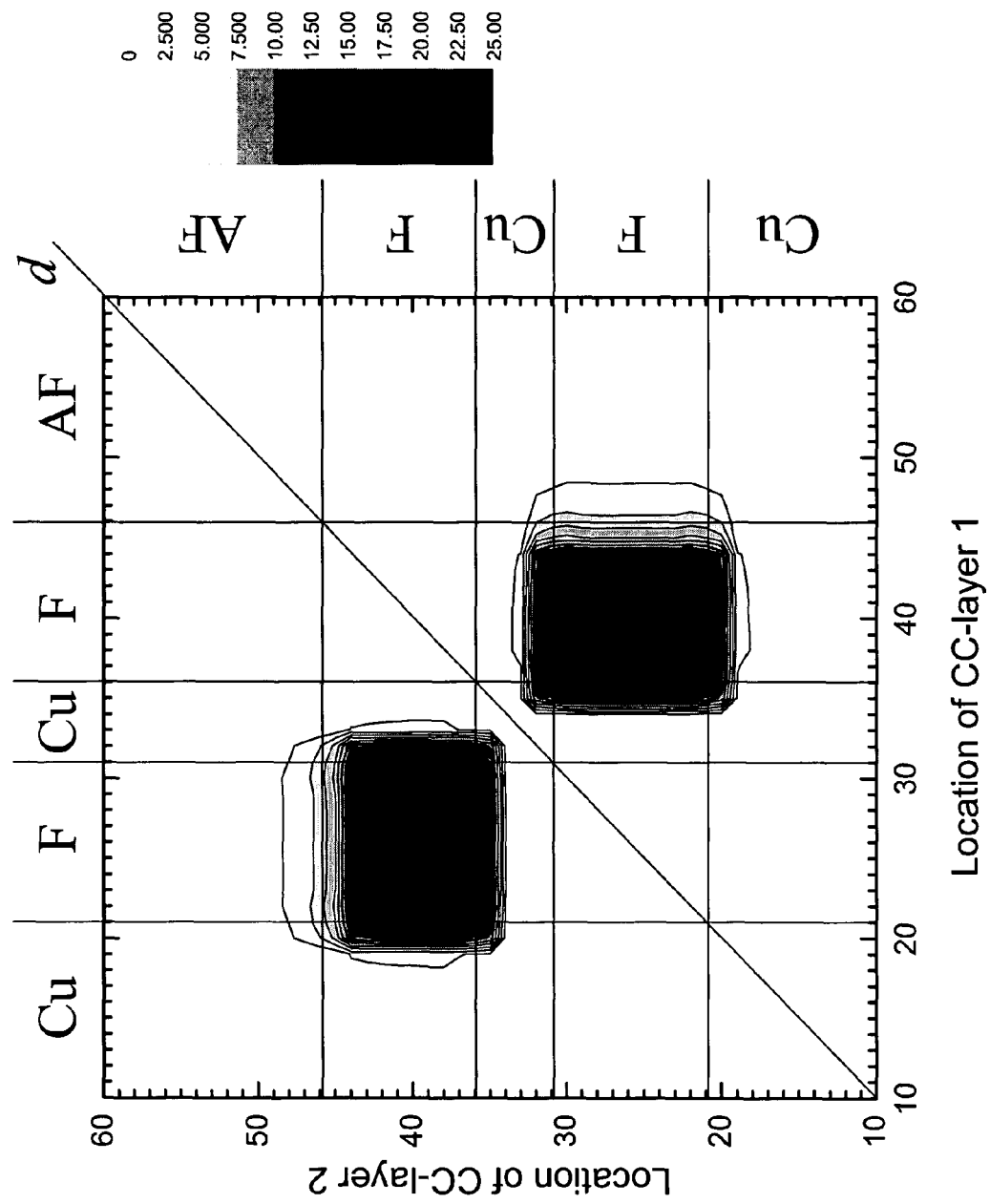
Figure 3:
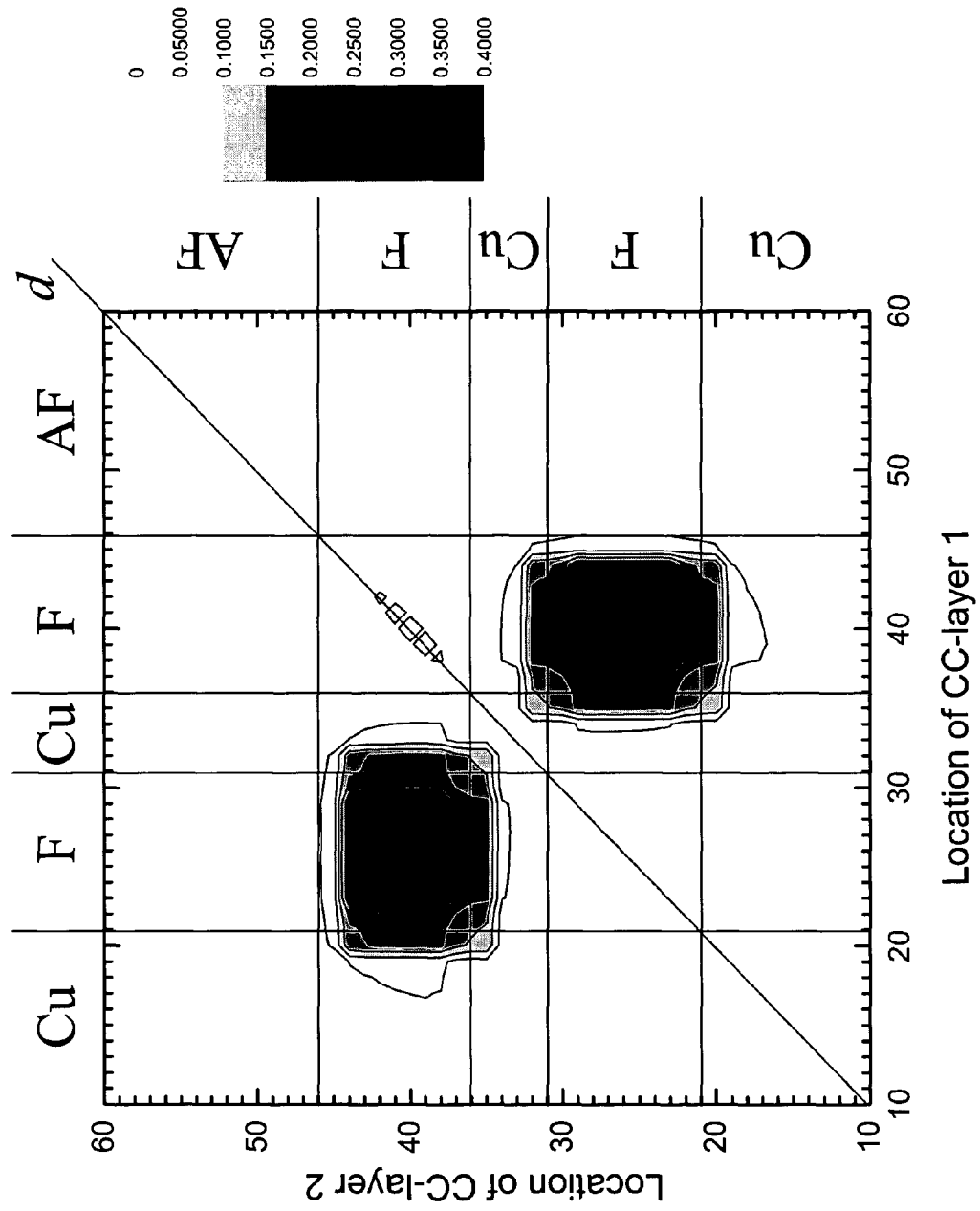
Figure 4:
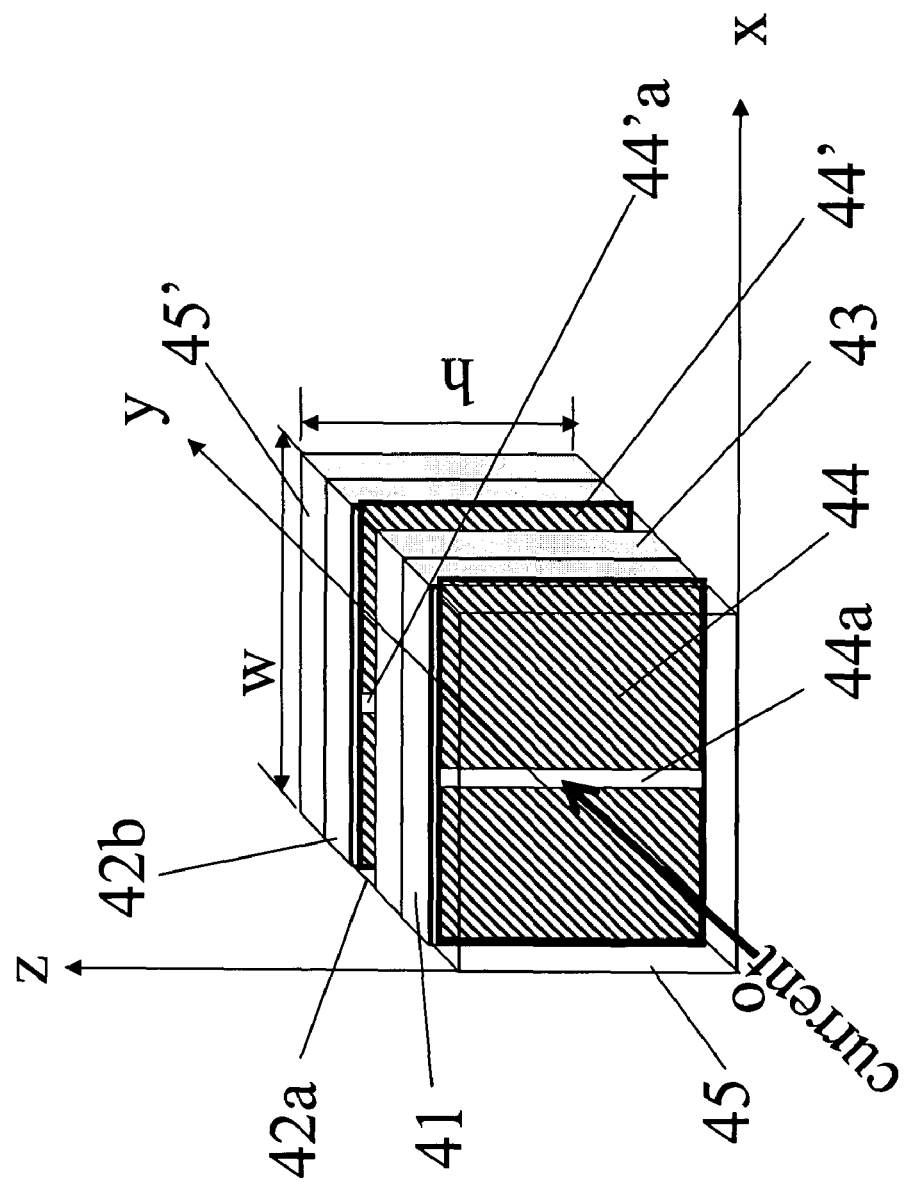
FIG. 4 is a schematic illustration of a simulation model.

Table 3: Calculation parameter sets (results are shown in FIGS. 3 and 4.): Parameters in the first column (e.g., (a) and (b)) correspond to the diagrams in FIG. 3. The suffixes (F, I, Low, and High) stand for Ferromagnetic layers, Interface between Ferromagnetic layer and Cu layer, Low resistivity channel, and High resistivity channel, respectively.

TABLE 3

| Parameter set | Ave. of $\beta$ and $\gamma$ | $\beta$ | $\gamma$ | $\rho_{F\text{-}Low}$ ($\mu\Omega$ cm) | $\rho_{F\text{-}High}$ ($\mu\Omega$ cm) | $t_F$ (nm) | $\rho_{I\text{-}Low}$ ($\mu\Omega$ cm) | $\rho_{I\text{-}High}$ ($\mu\Omega$ cm) |
|---|---|---|---|---|---|---|---|---|
| (a) | 0.46 | 0.58 | 0.34 | 32 | 120 | 1.5 | 300 | 610 |
| (b) | 0.46 | 0.58 | 0.34 | 32 | 120 | 3 | 300 | 610 |
| (c) | 0.46 | 0.58 | 0.34 | 32 | 120 | 4.5 | 300 | 610 |
| (d) | 0.46 | 0.46 | 0.46 | 34 | 93 | 1.5 | 270 | 740 |
| (e) | 0.46 | 0.46 | 0.46 | 34 | 93 | 3 | 270 | 740 |
| (f) | 0.46 | 0.46 | 0.46 | 34 | 93 | 4.5 | 270 | 740 |
| (g) | 0.46 | 0.34 | 0.58 | 37 | 76 | 1.5 | 250 | 950 |
| (h) | 0.46 | 0.34 | 0.58 | 37 | 76 | 3 | 250 | 950 |
| (i) | 0.46 | 0.34 | 0.58 | 37 | 76 | 4.5 | 250 | 950 |
| (j) | 0.7 | 0.85 | 0.55 | 27 | 330 | 1.5 | 260 | 890 |
| (k) | 0.7 | 0.85 | 0.55 | 27 | 330 | 3 | 260 | 890 |
| (l) | 0.7 | 0.85 | 0.55 | 27 | 330 | 4.5 | 260 | 890 |
| (m) | 0.7 | 0.7 | 0.7 | 29 | 170 | 1.5 | 240 | 1300 |
| (n) | 0.7 | 0.7 | 0.7 | 29 | 170 | 3 | 240 | 1300 |
| (o) | 0.7 | 0.7 | 0.7 | 29 | 170 | 4.5 | 240 | 1300 |
| (p) | 0.7 | 0.55 | 0.85 | 32 | 111 | 1.5 | 220 | 2700 |
| (q) | 0.7 | 0.55 | 0.85 | 32 | 111 | 3 | 220 | 2700 |
| (r) | 0.7 | 0.55 | 0.85 | 32 | 111 | 4.5 | 220 | 2700 |

Calculation parameter sets (results are shown in FIG. 3 and 4.):
Parameters in the first column (e.g., (a) and (b)) correspond to the diagrams in FIG. 3.
The suffixes (F, I, Low, and High) stand for Ferromagnetic layers, Interface between Ferromagnetic layer and Cu layer, Low resistivity channel, and High resistivity channel, respectively.

Figure 5:
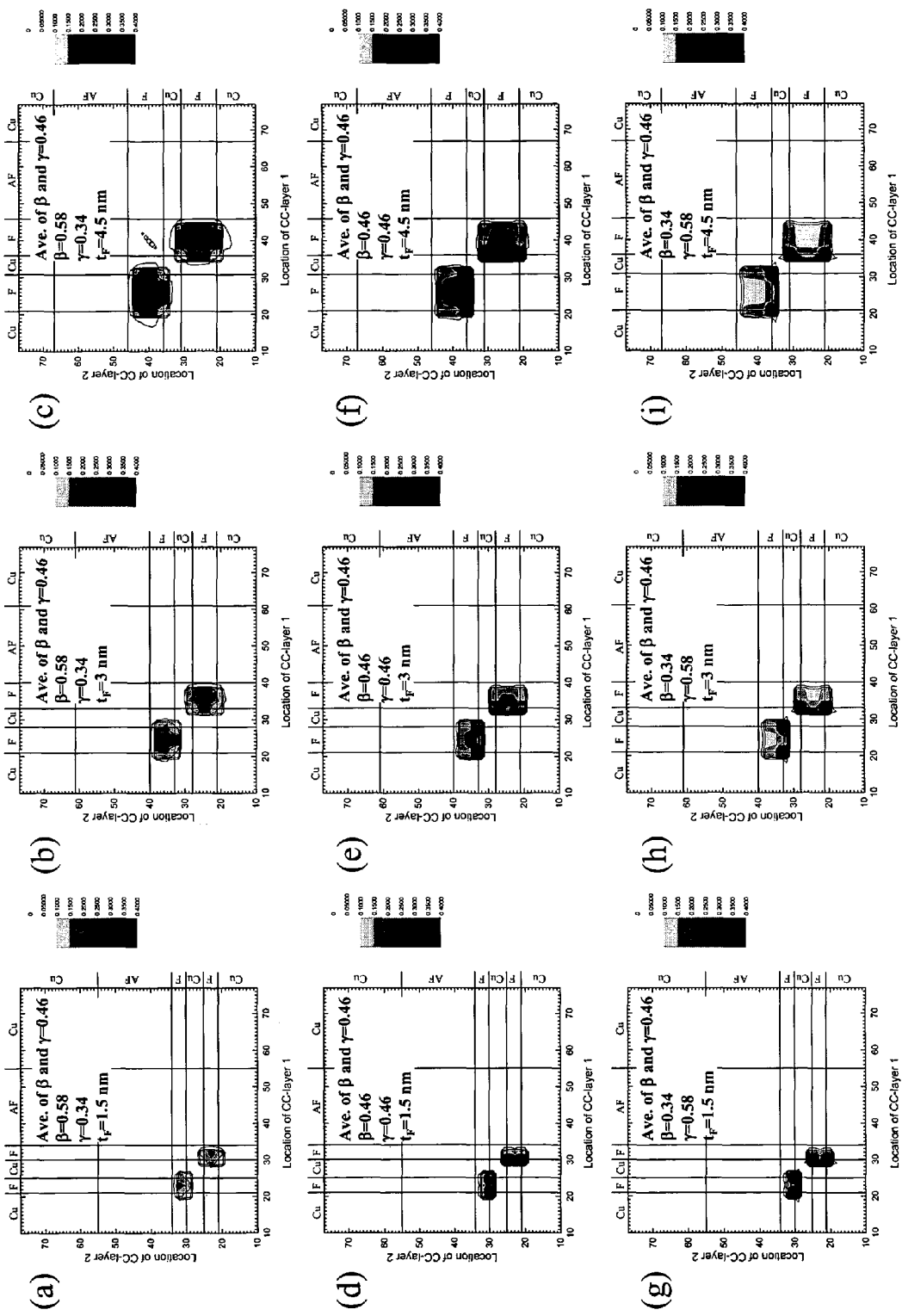
FIGS. 5(a) to 5(r) are contour maps of the GMR ratio with respect to the location of the two CC-layers in a CPP spin-valve structure of the present invention with various distinct sets of parameters.
Figure 5:
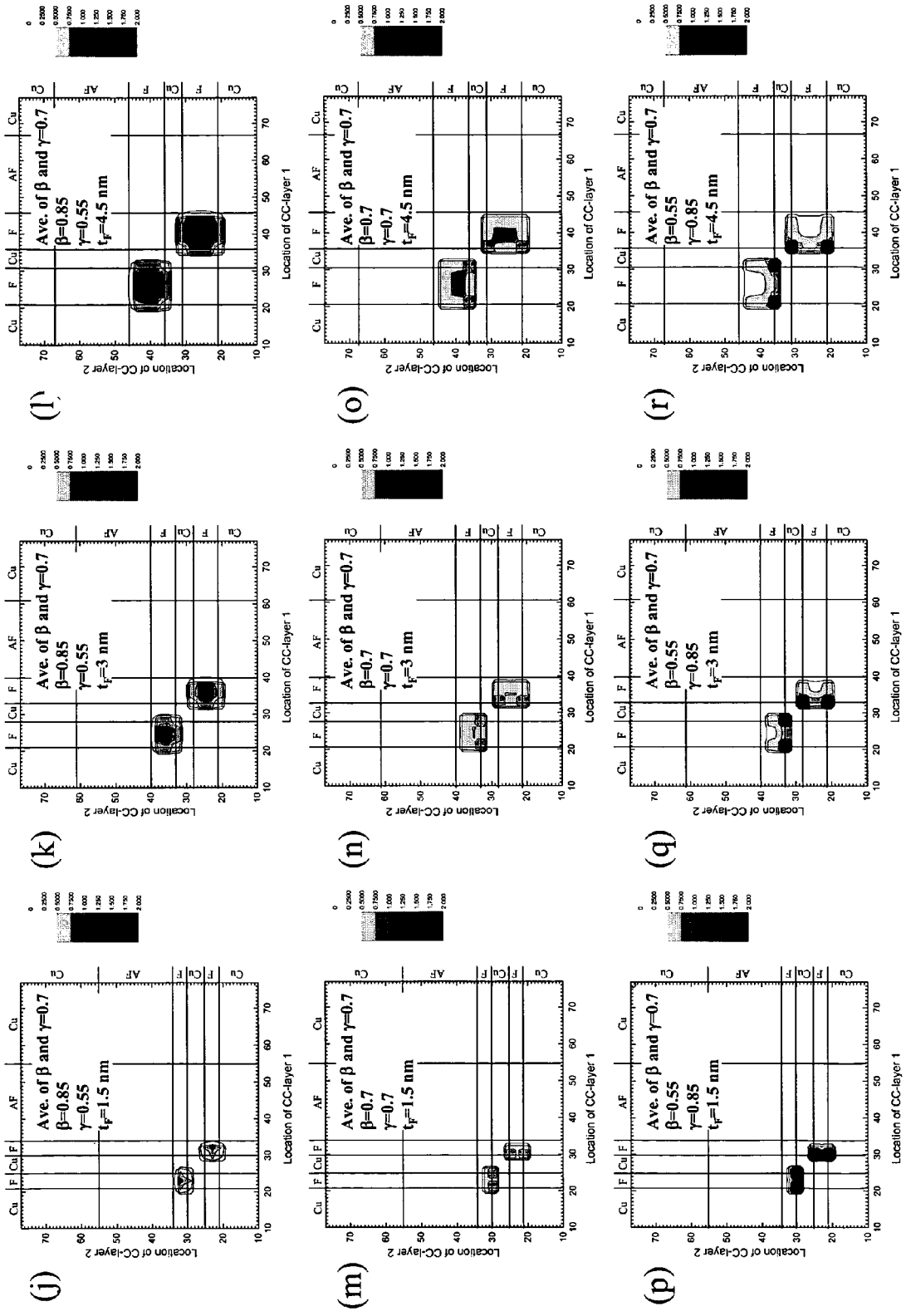
Figure 5:
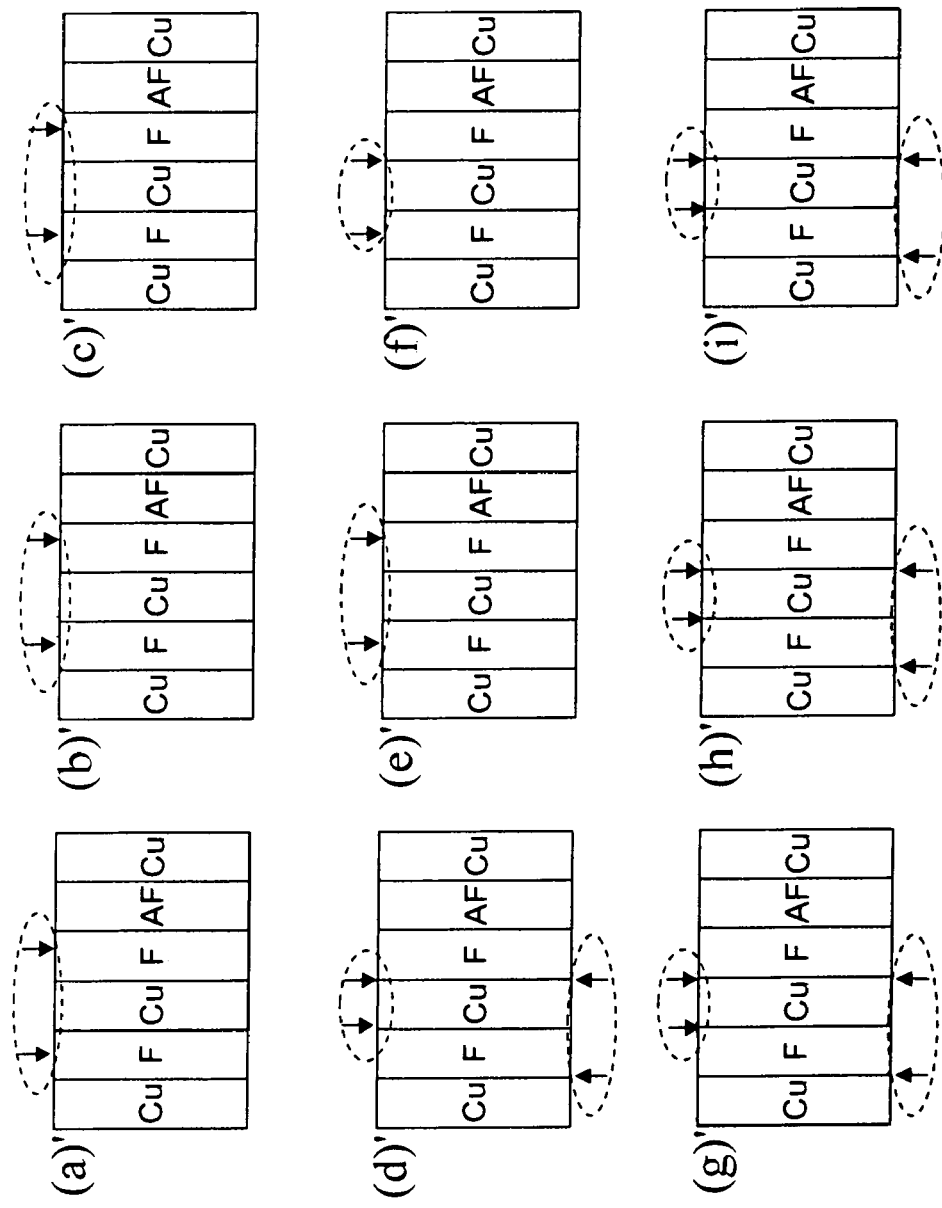
Figure 6:
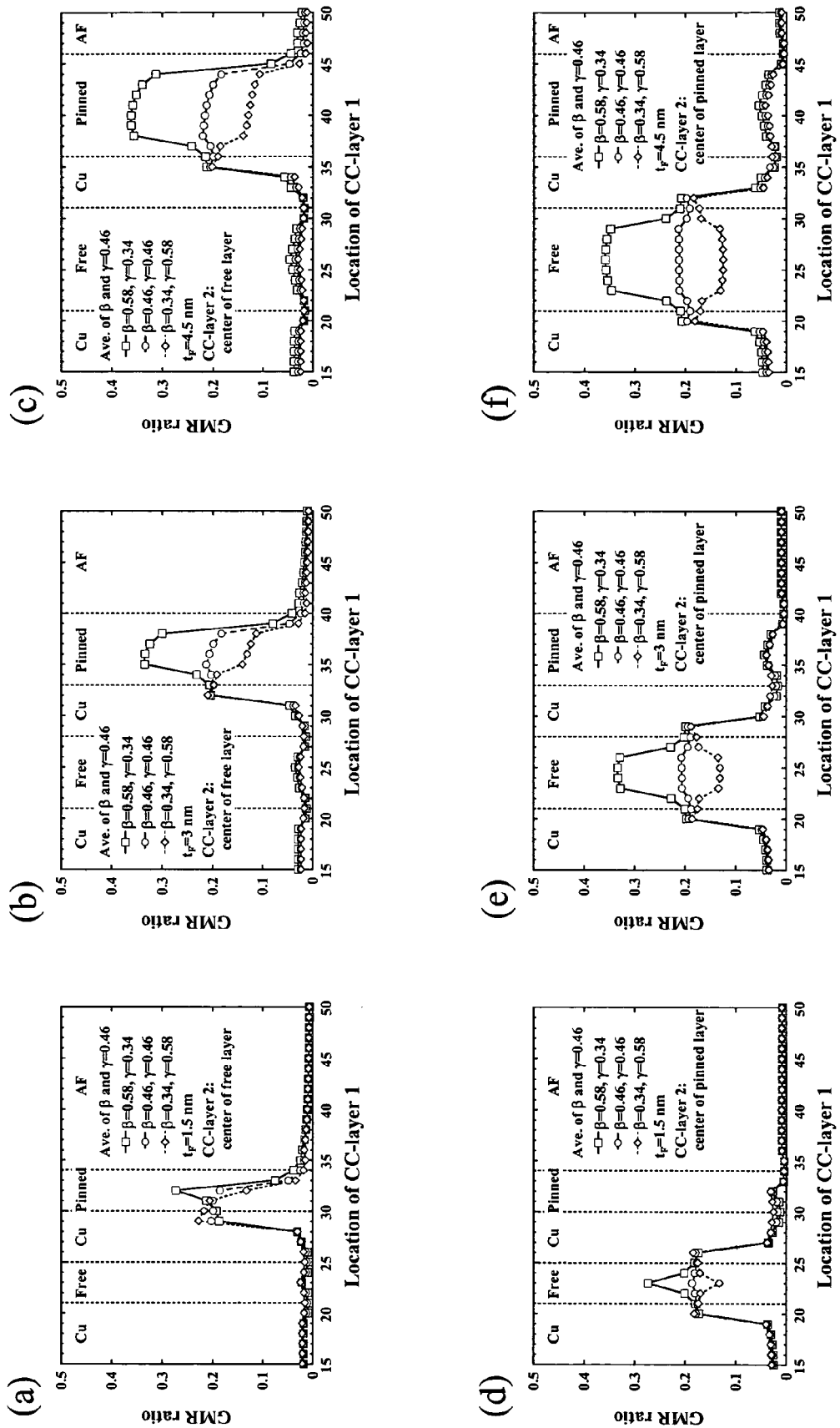
FIGS. 6(a) to 6(l) illustrate the GMR ratio versus the location of a CC-layer for the CPP spin-valve structure of the present invention as shown in FIG. 5 with distinct sets of parameters.
Figure 6:
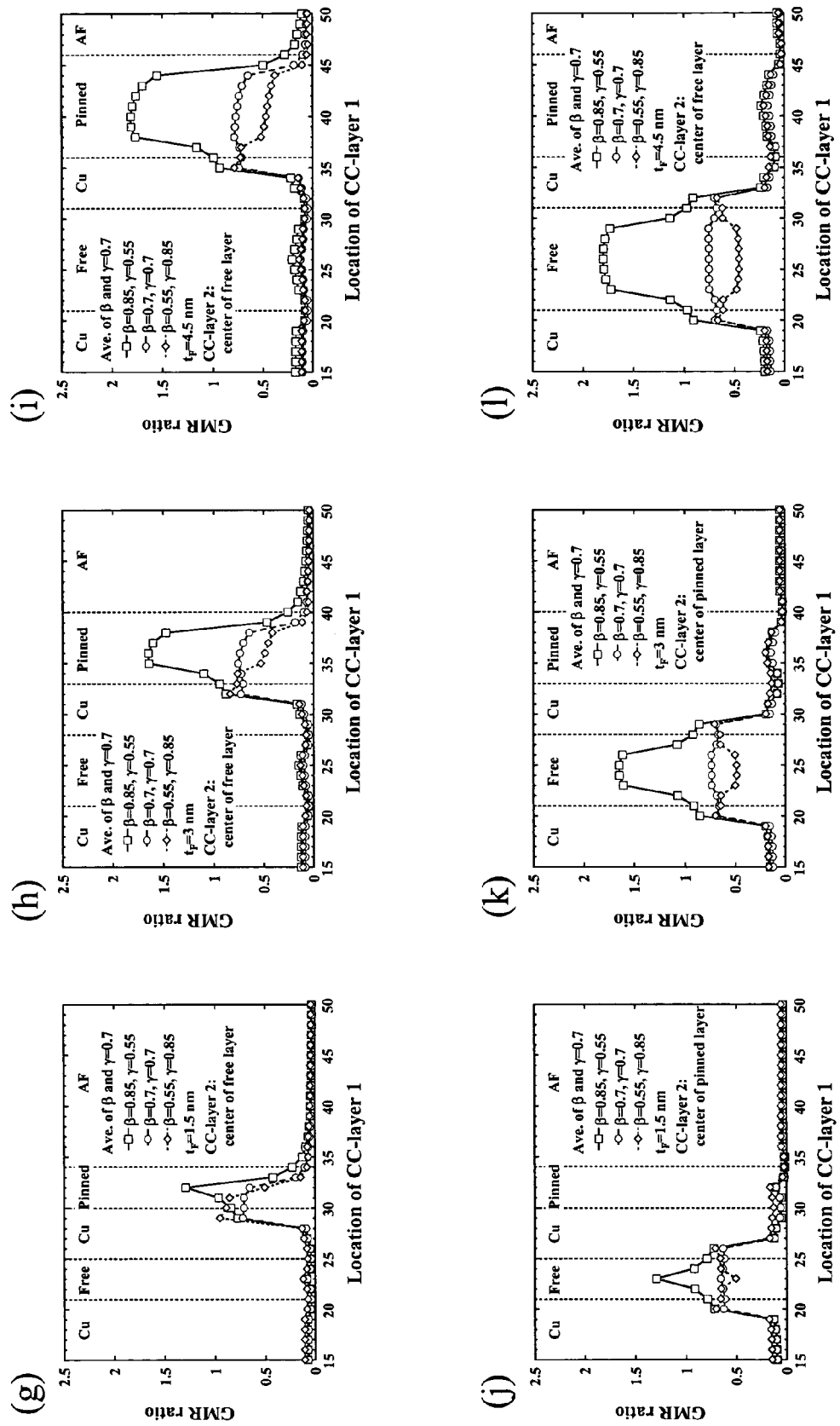

FIGS. 5(*a*) to 5(*r*) and FIGS. 6(*a*) to 6(*l*) show the calculated results formulated by simulation for the parameter sets shown in Table 3. FIGS. 5(*a*), 5(*b*) and 5(*c*) show the contour maps of the GMR ratio obtained by the simulation for the parameters β=0.58 and γ=0.34, for the ferromagnetic layer thickness $t_F$=1.5 nm, 3.0 nm and 4.5 nm, respectively. FIGS. 5(*d*), 5(*e*), and 5(*f*) show the contour maps of the GMR ratio obtained by the simulation for the parameters β=0.46 and γ=0.46, and for the ferromagnetic layer thickness $t_F$=1.5 nm, 3.0 nm and 4.5 nm, respectively. FIGS. 5(*g*), 5(*h*), and 5(*i*) show the contour maps of the GMR ratio obtained by the simulation for the parameters β=0.34 and γ=0.58, for the ferromagnetic layer thickness $t_F$=1.5 nm, 3.0 nm and 4.5 nm, respectively. FIGS. 5(*j*), 5(*k*), and 5(*l*) show the contour maps of the GMR ratio obtained by the simulation for the parameters β=0.85 and γ=0.55, and for the ferromagnetic layer thickness $t_F$=1.5 nm, 3.0 nm and 4.5 nm, respectively. FIGS. 5(*m*), 5(*n*), and 5(*o*) show the contour maps of the GMR ratio obtained by the simulation for the parameters β=0.70 and γ=0.70, and for the ferromagnetic layer thickness $t_F$=1.5 nm, 3.0 nm and 4.5 nm, respectively. FIGS. 5(*p*), 5(*q*), and 5(*r*) show the contour maps of the GMR ratio obtained by the simulation for the parameters β=0.55 and γ=0.85, and for the ferromagnetic layer thickness $t_F$=1.5 nm, 3.0 nm and 4.5 nm, respectively.

FIGS. 5(*a*)' to 5(*r*)' are corresponding cross-sectional views of the contour maps of the spin-valve structures illustrated in FIGS. 5(*a*) to 5(*r*), and the pair of encircled arrows reflect preferable location for the cc-layers to be inserted. The locations are extracted from the contour maps of FIGS. 5(*a*) to 5(*r*).

FIGS. 6(*a*), 6(*b*), and 6(*c*) show the dependence of the GMR ratio on the location of one of the CC-layers, CC-layer 1, when the other CC-layer, CC-layer 2, is fixed at the center of the free layer. Regarding the parameters, the average of β and γ is equal to 0.46 and the thickness of the ferromagnetic layers are $t_F$=1.5 nm, 3 nm, and 4.5 nm, respectively. FIGS. 6(*d*), 6(*e*), and 6(*f*) show the dependence of the GMR ratio on the location of CC-layer 1 when CC-layer 2 is fixed at the center of the pinned layer for the following parameters: the average of β and γ is equal to 0.46 and $t_F$=1.5 nm, 3 nm and 4.5 nm, respectively. FIGS. 6(*g*), 6(*h*), and 6(*i*) show the dependence of the GMR ratio on the location of CC-layer 1 when CC-layer 2 is fixed at the center of the free layer for the following parameters: average of β and γ is equal to 0.70 and $t_F$=1.5 nm, 3 nm and 4.5 nm, respectively. FIGS. 6(*j*), 6(*k*), and 6(*l*) show the dependence of the GMR ratio on the location of CC-layer 1 when CC-layer 2 is fixed at the center of the pinned layer for the following parameters: the average of β and γ is equal to 0.70 and $t_F$=1.5 nm, 3 nm and 4.5 nm, respectively.

It is clearly seen that when one of the two CC-layers is located within or in the vicinity of the free layer and the other is located within or in the vicinity of the pinned layer, the ΔR and the GMR ratio are significantly greater than otherwise. Different features are seen, however, for a different set of parameters. When γ is greater than β, the maximum effect is obtained when the CC-layers are located at or in the vicinity of the interface between the magnetic layers (the free layer and the pinned layer) and the conducting layers (the conducting spacer layer or the lead connected to the free layer). On the other hand, when γ is smaller than β, the maximum effect is obtained when each CC-layer is located in the middle of each magnetic layer, the free layer and the pinned layer.

Thus, an exemplary embodiment of the CPP spin-valve elements, according to the present invention, is a spin-valve element formed on a substrate including first and second thin ferromagnetic layer structures separated by a thin conducting layer structure of non-magnetic material (i.e., the conducting spacer layer structure) and two CC-layer structures including at least two parts having a significantly different current conductivities. The CC-layer structures are located within and/or in the vicinities of the first and second ferromagnetic layer structures. It is easier to change the direction of the magnetization of one of the free layer structure than that of the pinned layer structure by application of a magnetic field.

Figure 7:
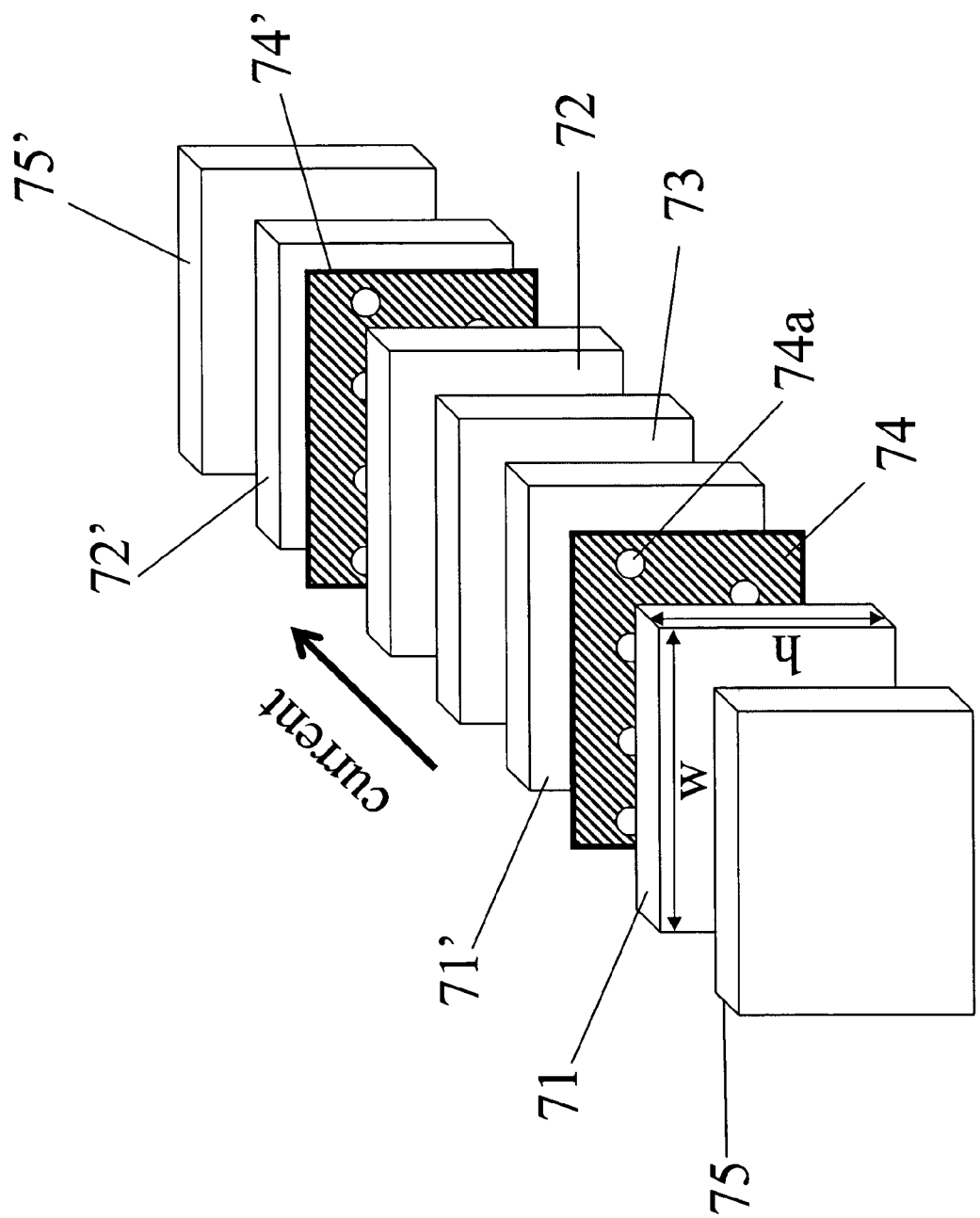
FIG. 7 is a schematic view of the structure of an embodiment of the present invention.

FIG. 7 illustrates a schematic of an embodiment of the present invention. Elements 71, 71' and 72, 72' are magnetic layer structures, either which is a free layer structure and the other is a pinned layer structure with a conducting spacer layer structure 73 and two CC-layer structures 74 and 74' in between. Each layer structure has a width w and a height h.

Each of the CC-layer structures confines the current path from going from one side of the CC-layer structure to the other side of the CC-layer structure in order to increase the total resistance of the spin-valve element and to obtain high output voltage when a reasonable amount of current is applied to the spin-valve element perpendicular to the element layer structure. Each of the CC-layer structures 74 includes an insulator with a conducting part or a plurality of conducting parts. When the conducting part is a hole or a slit and one of the CC-layers is inserted between one of the magnetic layer structures 71 and 72 and the conducting layer structure 73, one of the magnetic layer structures 71 and 72 and the conducting spacer layer structure 73 are directly connected to each other through the hole(s) or slit(s). Each of the CC-layer structures 74 and 74' can be of a mosaic structure including at least two parts having significantly different conductivities. The spin valve element is connected to a current source from one side to the other through the leads 75 and 75'. The pinned layer structure can be either a single ferromagnetic layer with a higher coercivity than the free layer, a ferromagnetic layer exchange coupled with an anti-ferromagnetic layer, or a sandwiched structure including (i) a ferromagnetic layer, (ii) a non-magnetic layer, and (iii) a ferromagnetic layer. The sandwiched structure is called a synthetic antiferromagnetic layer structure. One of the ferromagnetic layers of the synthetic antiferromagnetic layer is exchange coupled with an antiferromagnetic layer, or any modifications thereof.

Figure 8:
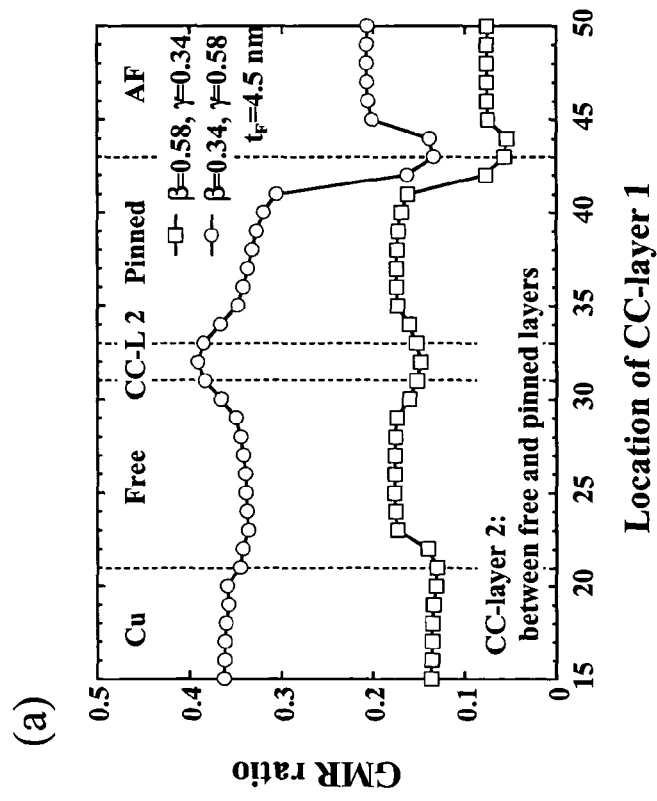
FIGS. 8(a) and 8(b) illustrate the GMR ratio and the output voltage ΔV versus the location of a CC-layer for another type of CPP spin-valve element structure of the present invention.
Figure 8:
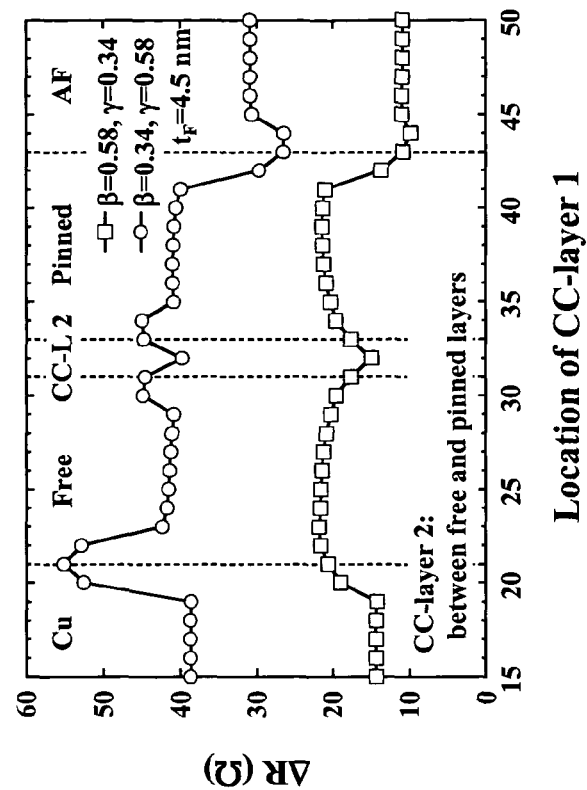

FIGS. 8(a) and 8(b) show the dependence of the GMR ratio and the magnetoresistance ΔR on the location of CC-layer 1 when CC-layer 2 is fixed between the two magnetic layers without any conducting layer. This structure corresponds to the layer structure in which CC-layer 2 is located at the location number 32 in the Table 1. It is seen that for the case where β>γ, the GMR ratio and ΔR are maximized when CC-layer 1 is located in the magnetic layers. On the other hand, when β<γ, a prominent maximum in the magnetoresistance ΔR is obtained when CC-layer 1 is located at and/or in the vicinity of the interface between the free layer and the Cu layer located farthest from the pinned layer structure.

Figure 9:
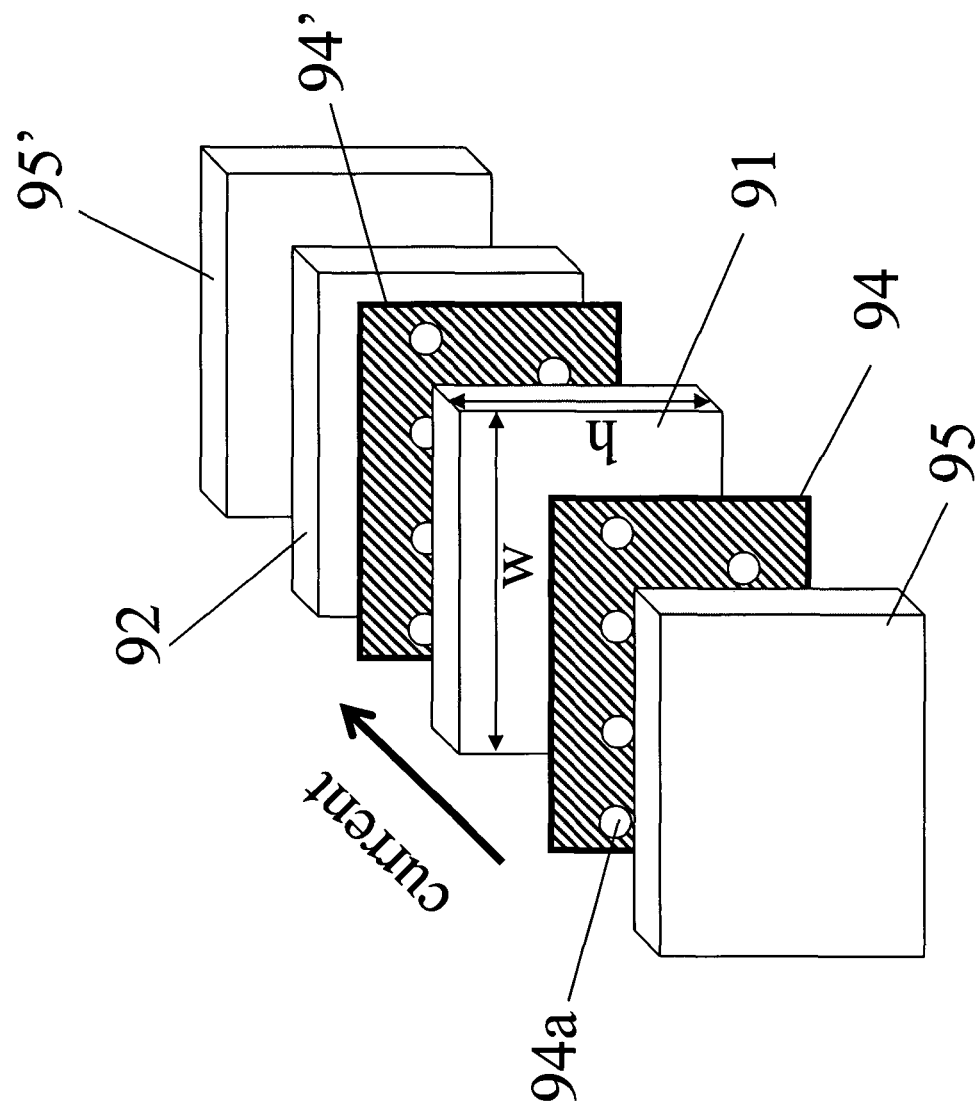
FIG. 9 is a schematic view of the structure of an embodiment of the present invention of one of the structures as illustrated in FIG. 8.

FIG. 9 schematically illustrates an example of an embodiment relating to the results described above. Here, 91 and 92 are a free layer and a pinned layer structure, or vice versa, 94 and 94' are CC-layers, and 95 and 95' are electric leads. The pinned layer structure can be either a single ferromagnetic layer with a higher coercivity than the free layer, a ferromagnetic layer exchange coupled with an antiferromagnetic layer, or a synthetic antiferromagnetic layer structure. One of the ferromagnetic layers of the synthetic antiferromagnetic layer is exchange coupled with the antiferromagnetic layer, or any modifications thereof. In the former case, the spin-valve structure including one CC-layer between the pinned and free layers and including two CC-layers inserted in the vicinities of the outer interfaces of each pinned and free layers (total three CC-layers) constitutes a preferred embodiment.

Figure 10:
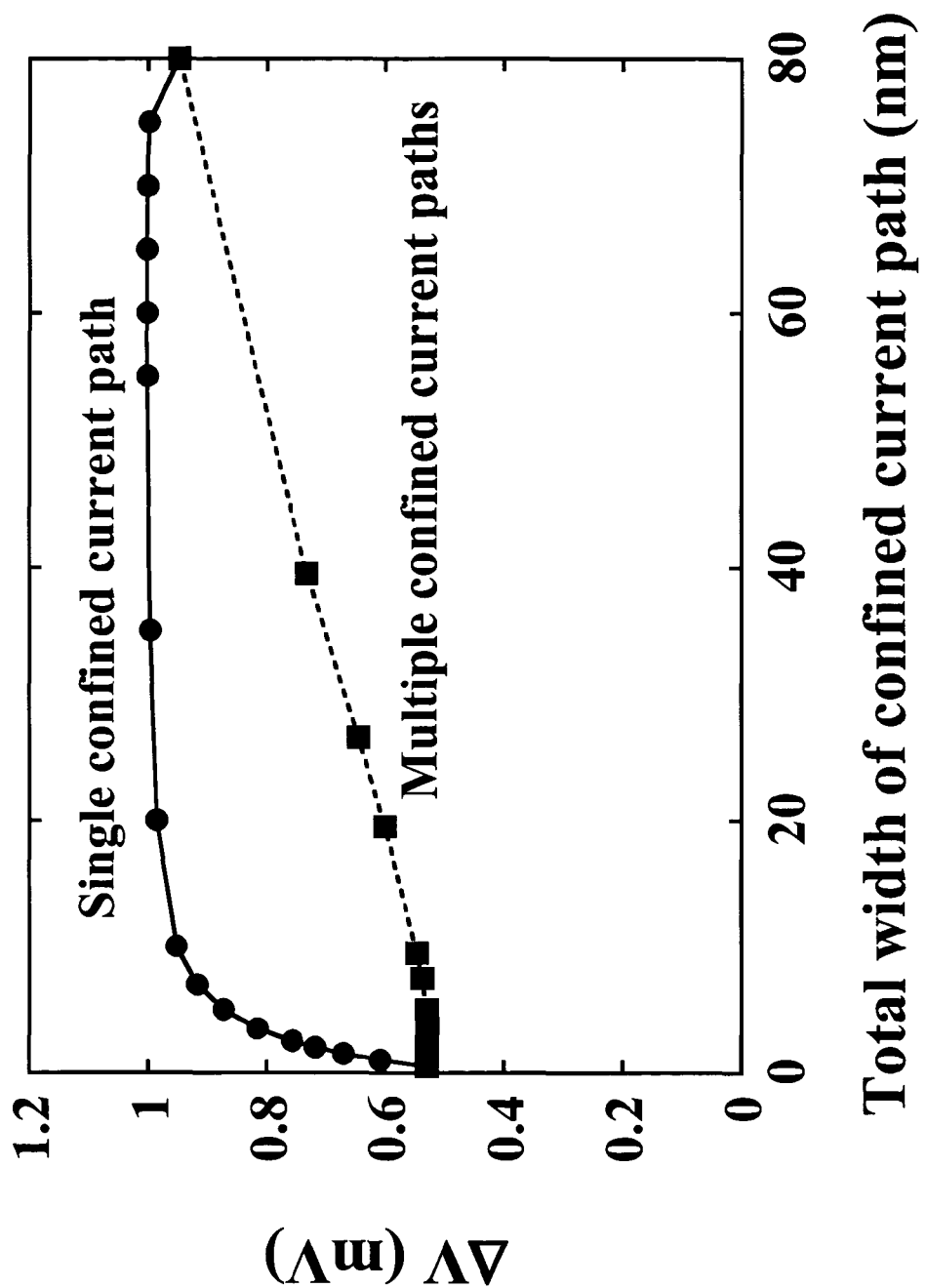
FIG. 10 is a graph showing the dependence of the output voltage ΔV on the total width of the conducting paths in the CC-layer.

FIG. 10 illustrates the dependence of the output voltage ΔV=ΔR×I, wherein I is the sense current applied to the spin-valve element on the total conducting part width in a CC-layer for two spin-value structures with different type of CC-layer structures, one having only one conducting part and the other having a plurality of conducting parts. Both of the CC-layer structures are 1 nm thick having the same parameters as those shown in Table 2. One CC-layer structure has only one conducting part and the other CC-layer structure has a plurality of conducting parts. Each of the CC-layer structures of one of the spin-valve structures has only one conducting part and each of the CC-layer structures of the other spin-valve structure has a plurality of conducting parts. The width of each conducting part of the CC-layer for the latter spin-valve element was set at 0.5 nm and the total conducting part width was varied by varying the number of conducting parts. The applied current I was chosen so as to keep the current density at the conducting part of each CC-layer equal to 100 MA/cm². It is seen that when the total width of the conducting part of the CC-layer for each spin-valve structure are equal to other, the former spin-valve structure gives much higher ΔV than the latter except on both extreme ends of the total width. That is, a single conducting part structure is preferable in order for the CC-layers to obtain higher ΔV for a conducting part having a predetermined total width than a structure where the conducting part is divided into multiple parts.

This result is caused by the difference of the current flow distributions (not shown). The division of a conducting part into multiple parts makes the effective width, $W_{CCP\text{-}eff}$, (or the effective area) of the current flow greater than the physical width, $W_{CCP}$, (or the physical area) of the conducting part. This causes the decrease in ΔV. By increasing the number of conducting parts, the ratio $W_{CCP\text{-}eff}/W_{CCP}$ increases due to the increase in the edge of conducting part, from which the current spreads in the track width, and sensor height directions as the distance from the conducting part increases. The greater the ratio $W_{CCP\text{-}eff}/W_{CCP}$, the smaller ΔV becomes. However, because the magnetizations in a practical free layer behaves rather independently from each other when they are apart by a greater distance than a critical value (i.e., an "exchange length") of the free layer, which is usually in the range of between several tens of nanometers to several hundred nanometers, it is desirable to distribute the conducting part in CC-layers so that at least one conducting part exists in every magnetic flux path of a width equal to the exchange length. This is especially true when the spin-valve element is used as a sensor of magnetic field such as a read head for magnetic recording, as is described in U.S. Pat. No. 6,560,077. Thus, it is especially beneficial, in order to keep the magnetic medium noise low, to make the distance between the adjacent conducting parts smaller than the exchange length. However, from the point of view of obtaining a high output ΔV for the same total width (or total area) of the conducting parts in a CC-layer, it is desirable to make the number of conducting parts as small as possible. A compromise of the above two incompatible requirements can be attained by making the edge to edge distance of the neighboring conducting parts smaller than the exchange length of the free layer and the distance between the centers of the neighboring conducting parts of the CC-layer larger than the exchange length.

Figure 11:
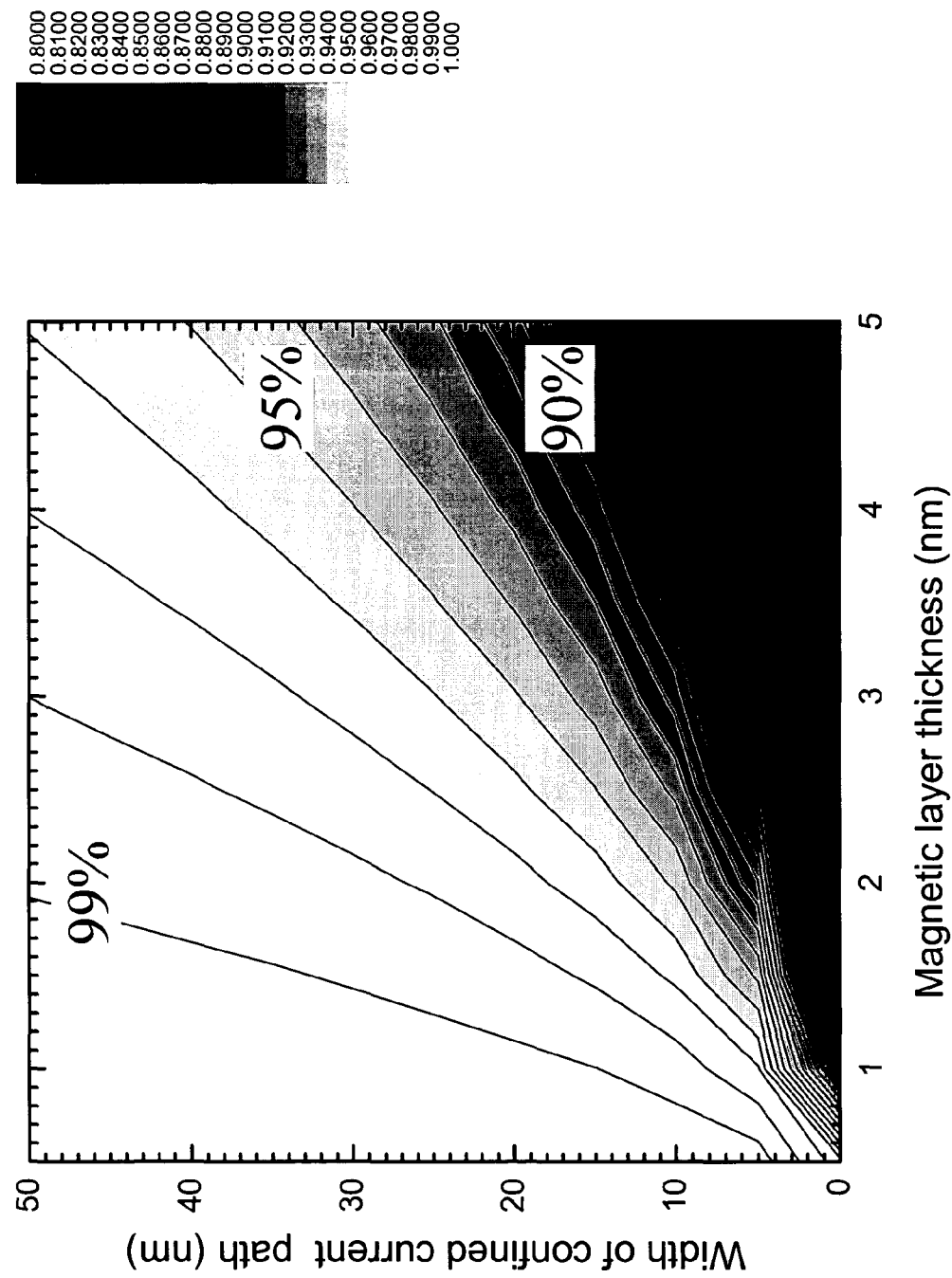
FIG. 11 is a contour map of the normalized output voltage as functions of the thickness of the free layer and the pinned layer and the width of the confined current path in the CC-layer of a spin-valve element of the same structure and parameters as the example of FIG. 10.

FIG. 11 depicts a contour mapping of the ratio of ΔV of a spin-valve element as a function of the width of the conducting part of the CC-layers, each having one conducting part, and the thickness of the magnetic layers (assuming the thicknesses of the free and pinned layers are the same) to ΔV (of the spin-valve element with the same structure and the same parameters, but without a CC-layer, as were used for obtaining the results shown in FIG. 10, $\Delta V_0$). With the increase of the thicknesses of the magnetic layers and the decrease of the width of the conducting part, $\Delta V/\Delta V_0$ becomes smaller. This is caused by the difference between the width (or area) of the conducting part and the effective width (or area) of the current flow. The width of the confined current path $W_{CCP}$ in the CC-layers which gives a constant ratio of $\Delta V/\Delta V_0$, can well be fitted with a relation, $W_{CCP}=Ct_F^{3/2}$ by least square fitting, where $t_F$ is the thickness of the magnetic layer and C is a proportional factor, which depends on the value of $\Delta V/\Delta V_0$. For instance, C is 1.1 for the ratio of 80% and 2.6 for 90%, when $t_F$ is measured in the unit of nm. Thus, roughly speaking, in order to attain $\Delta V/\Delta V_0$ greater than 80%, $W_{CCP}$ should be made greater than a critical value, $W_{CCP-Cr}$, which is nearly equal to $t_F^{3/2}$ with being measured in the unit of nm. This relationship was derived from the calculation using a model where CC-layers with a slit shaped confined current path were incorporated. It was confirmed that $W_{CCP-Cr}$, derived from a model where CC-layers with a square-hole shaped confined current path were incorporated, was about twice as large as that obtained for the slit type model.

Figure 12:
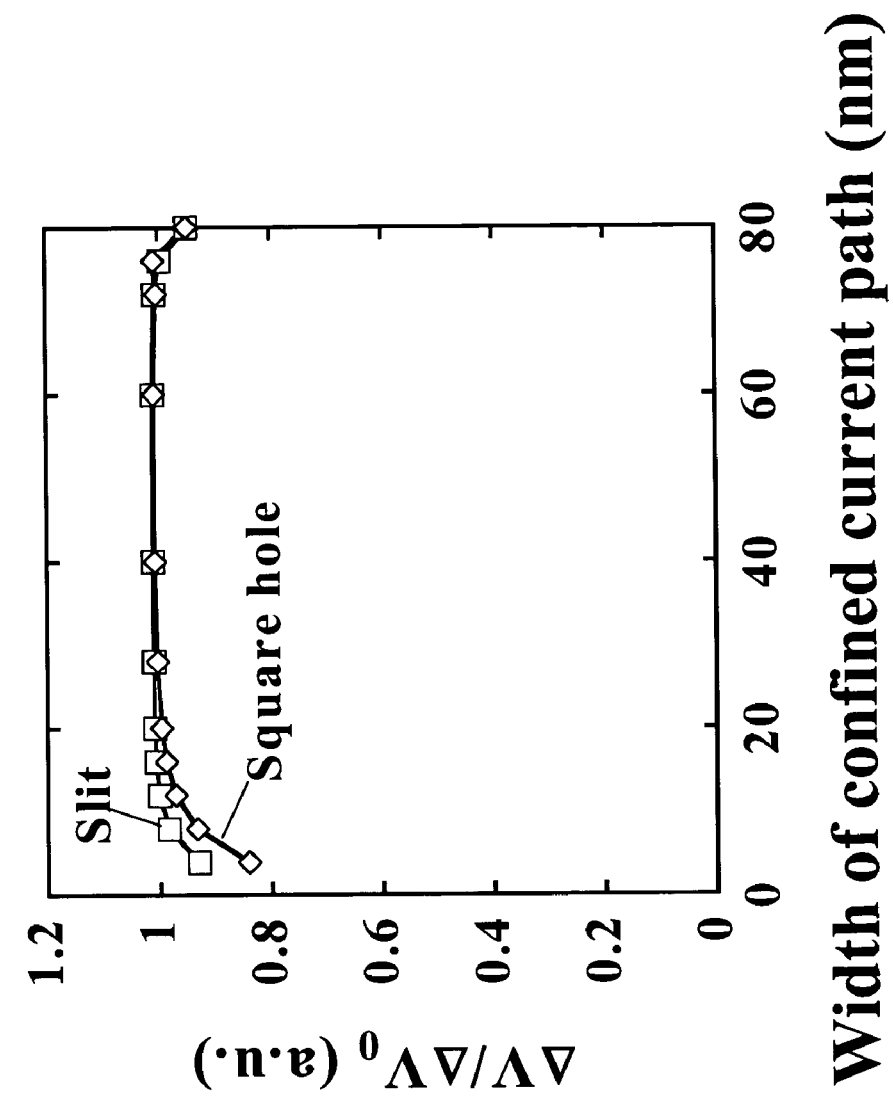
FIG. 12 is a graph showing the normalized output versus the width of the confined current path for the same structure and parameters as the example of FIG. 10.

FIG. 12 shows $\Delta V/\Delta V_0$ values obtained for the slit type and square hole type models described above plotted as a function of $W_{CCP}$ for the same structure and the parameters as those of the model with one conducting part in the CC-layer used for the calculation for obtaining the results shown in FIG. 10. It is seen that, although quantitatively, a considerable difference is seen between the results obtained for the two models, the qualitative features for both models are quite similar.

Figure 13:
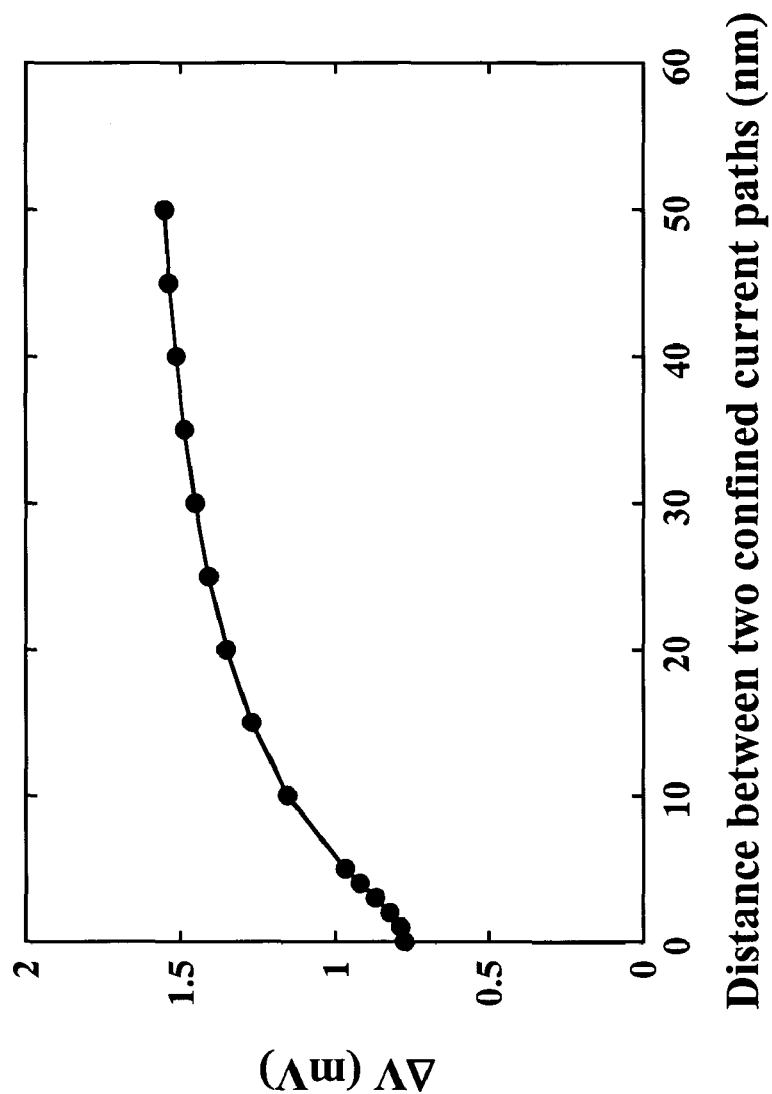
FIG. 13 is a graph showing the dependence of the output on the distance between the conducting parts in the two CC-layers, each having one conducting part, located across the free layer of an embodiment of the present invention.

FIG. 13 depicts $\Delta V$'s dependence on the distance in the in-plane direction between the two conducting parts of the two CC-layers, each having a slit of 3 nm width with Cu imbedded, and placed across the free layer having the following structure: Cu/CC-layer/free layer/CC-layer/pinned layer/AF/Cu. The thicknesses of the free layer and the pinned layer were chosen to be 3 nm. Here, the current was chosen so that the maximum current density in the free layer was kept constant at 100 MA/cm². Other parameters chosen for the calculation were the same as the parameters set for the structure with a single conducting part in the CC-layers used for obtaining the results shown in FIG. 10. While increasing the distance between conducting parts of the two CC-layers, $\Delta V$ increased monotonically. This occurred because the length of the current path in the magnetic layer increased as the distance between the slits increased, causing an equivalent effect to that of the increase in the thickness of the magnetic layer on the GMR effect. This configuration of the conducting parts of the two CC-layers will be referred to as a "Cascade Arrangement." For the current path length $l_{cp}$, which is not much greater than the spin diffusion length $l_{sf}$, the contribution of the bulk effect to the magnetoresistance $\Delta R_b$ can be expressed as $\Delta R_b \sim 1 - \exp(-l_{cp}/l_{sf})$. Thus, it is desirable that the value of $l_{cp}/l_{sf}$ be chosen to be greater than 0.5, more preferably, greater than 1 in order to obtain a large magnetoresistance. However, if the $l_{cp}$, becomes much greater than $l_{sf}$, the GMR effect starts to decrease.

According to K. Nagasaka, Y. Seyama, Y. Shimizu, and A. Tanaka, "Giant magnetoresistance properties of Spin Valve films in CPP (Current Perpendicular to Plane) geometry", J. Magn. Soc. Jpn. Vo. 25, 807-811(2001), the optimal path length $l_{cp}$ will be less than a few times, say about 3 times, more preferably about twice the spin diffusion length $l_{sf}$, which is about 12 nm for $Co_{90}Fe_{10}$, a typical magnetic material for spin-valve structures. See A. C. Reilly, W. Park, R. Slater, B. Ouaglal, R. Loloee, W. P. Pratt Jr., J. Bass, "Perpendicular giant magnetoresistance of $Co_{91}Fe_9$/Cu exchange-biased spin-valves: further evidence for a unified picture", J. Magn. Mater., Vol. 195, L269-L274 (1999). Ordinarily, the thickness of the free layer and/or pinned layers is designed to be thinner than their spin diffusion length. Therefore, the design where a pair of CC-layer structures are located on both sides across the free layer structure and/or the pinned layer and conducting parts of the CC-layers are located in a cascade manner, and at least the inner edge to edge distance of the projection of the conducting parts of the CC-layers forming the major current path(s) through the free layer structure and/or the pinned layer onto the layer plane is greater than the thickness of the free layer structure and/or the pinned layer facilitates obtaining a high magnetoresistance $\Delta R$. Nagasaka et al. and Reilly et al. are incorporated by reference herein.

Figure 14:
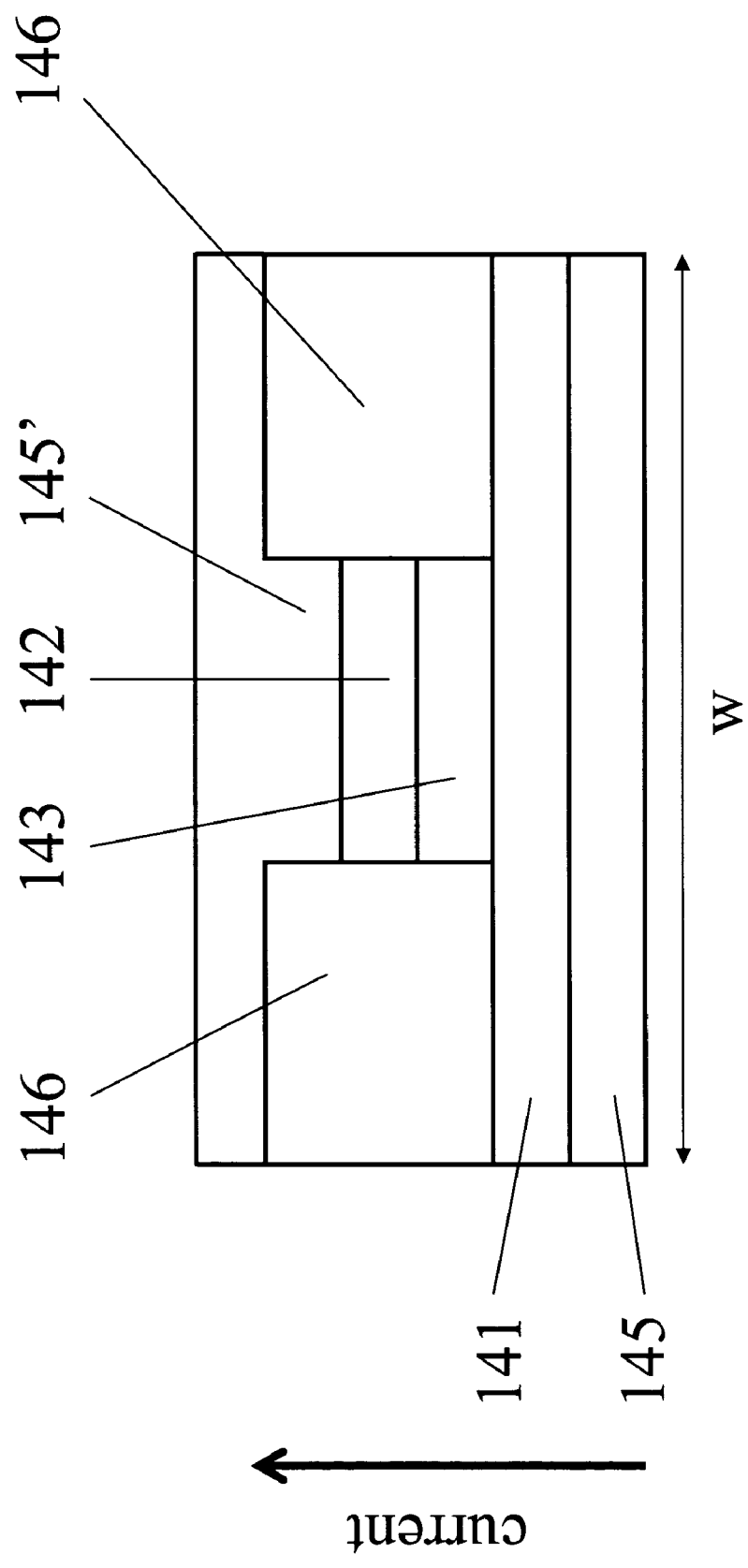
FIG. 14 is a schematic cross-sectional view of an embodiment of the present invention.

A similar effect described above, hitherto, can be expected for the spin-valve element structure where the pinned layer structure is constructed in the hole(s) or slit(s) of a CC-layer, a schematic cross-section of which is shown in FIG. 14, where 141, 142, and 143 are a free layer structure, a pinned layer structure, and a nonmagnetic conducting layer, respectively. 145 and 145' are conducting layers either of magnetic or of non-magnetic materials forming electric leads, and 146 is an insulating layer, forming a CC-layer structure together with 142 and 143 because the CC-layer structure works as a current confining layer for both the free layer 141 and the pinned layer 142, acting as if there were more than two CC-layer structures.

The CC-layer structure includes essentially two parts with significantly different conductivities, typically a conductor part having low resistivity and an insulator part having high resistivity as depicted by 74 schematically in FIG. 7. The CC-layer structure can be fabricated by means of various methods. One of the methods is a co-deposition of conducting material(s) and insulating material(s) which are essentially immiscible to each other by using a method such as physical vapor deposition (PVD) including vacuum sputtering, multiple source vacuum vapor deposition, laser deposition, etc.; chemical vapor deposition (CVD); or those PVD methods in combination with electrodeposition (ED) and/or CVD. The conducting materials are preferably selected from the group of Ag, Al, Au, Co, Cr, Cu, Fe, Mg, Mn, Nb, Ni, Pd, Pt, Si, Ta, Ti, V, Zr and their alloys and the insulating materials are preferably selected from the group of the oxides of any elements such as Al, Co, Cr, Cu, Fe, Mg, Mn, Nb, Ni, Pd, Si, Ta, Ti, V, and Zr, or the group of nitrides of any elements such as Al, B, C, Si and Ta. This method can be substituted by an alternate method where after making a layered structure of both conducting material(s) and insulating material(s), the layered structure is heat-treated resulting in a mosaic structure. Another method provides that after a co-deposition of immiscible metals, one of which is easier to oxidize than the other, the deposited layer is exposed to an oxidizing atmosphere. Instead of oxidation, nitridation may work if materials with different susceptibility to nitridation are chosen. Another method for fabricating the CC-layer structure, which provides the confined current paths of well controlled size, is a lithographical method using electrochemical scanning probes, as is provided by D. Hofmann, W. Schindler, and J. Kirschner, "Electrodeposition of nanoscale magnetic structures", Appl. Phys. Lett., Vol. 73, 3279-3281 (1998), which is incorporated herein by reference.

An example of the process is as follows: (1) a substrate/Cu/CoFe/$Al_2O_3$ multilayer structure is prepared by vacuum sputtering method; (2) the multilayer structure is set on an electrochemical scanning tunneling microscope (STM) filled with an alkaline electrolyte; (3) a dc or an ac pulse voltage is applied between the STM tip and the substrate so that a part of the $Al_2O_3$ layer is dissolved making a hole of a desired area in the $Al_2O_3$ layer; (4) flush solution with $H_2O$ and substitute with Cu plating solution; and (5) plate Cu into the hole to fill up by electrochemical deposition.

Numerous additional modifications and variations of the present invention are possible in light of the above teachings. It is therefore to be understood that within the scope of the appended claims, the present invention may be practiced otherwise than as specifically described herein.

We claim:

1. A CPP spin-valve element formed on a substrate comprising:

a free layer structure including at least one ferromagnetic layer;

a pinned layer structure including at least one ferromagnetic layer, the free layer is magnetically softer than the pinned layer; and a thin non-magnetic current confining (CC)-layer structure configured to separate the free and pinned layers, to prevent a substantial magnetic coupling between said free and pinned layer structures, and to allow an electric current to go through the confined current paths;

wherein the width of at least one of the confined current paths of said CC-layer structure is greater than $t^{3/2}$ where t is the thickness of at least one of said free layer structure and said pinned layer measured in nano-meters.

2. The CPP spin-valve element of claim 1, wherein the width of the confined current paths of said CC-layer structure is greater than two times $t^{3/2}$ where t is the thickness of at least one of said free layer structure and pinned layer measured in nano-meters.

3. The CPP spin-valve element of claim 1, wherein the average width of the confined current paths of said CC-layer structure is greater than 2.5 $t^{3/2}$ where t is the thickness of at least one of said free layer structure and said pinned layer measured in nano-meters.

4. The CPP spin-valve element of claim 1, wherein the average width of the confined current paths of said CC-layer structure is greater than $t^{3/2}$ where t is the thickness of at least one of said free layer structure and said pinned layer measured in nano-meters.

5. A CPP spin-valve element formed on a substrate comprising:

a free layer structure including at least one ferromagnetic layer;

a pinned layer structure including at least one ferromagnetic layer, the free layer is magnetically softer than the pinned layer; and a first thin non-magnetic current confining (CC)-layer structure configured to separate the free and pinned layers, to prevent a substantial magnetic coupling between said free and pinned layer structures, and to allow an electric current to go through the confined current paths; and a second CC-layer structure placed across at least one of the free layer and the pinned layer;

wherein conducting parts of said CC-layer are located in a cascade manner and a majority of the nearest inner edge to edge distances of a projection of the conducting parts of the CC-layers forming the current paths through said free layer structure or said pinned layer onto the layer plane are made greater than the thickness of at least one of said free layer and said pinned layer.

6. The CPP spin-valve element of claim 5, wherein the width of the confined current paths of said CC-layer structures is greater than $t^{3/2}$ where t is the thickness of at least one of said free layer structure and said pinned layer measured in nano-meters.

7. The CPP spin-valve element of claim 5, wherein the width of the confined current paths of said CC-layer structures is greater than two times $t^{3/2}$ where t is the thickness of at least one of said free layer structure and said pinned layer measured in nano-meters.

8. The CPP spin-valve element of claim 5, wherein the length of at least one of the current paths through at least one of said free layer structure and said pinned layer structure is greater than a half of a spin diffusion length in at least one of said free layer structure and said pinned layer and is smaller than 3 times as large as the spin diffusion length.

9. The CPP spin-valve element of claim 8, wherein the length of at least one of the current paths through at least one of said free layer structure and said pinned layer structure is greater than a spin diffusion length in at least one of said free layer structure and said pinned layer and is smaller than 2 times as large as the spin diffusion length.

10. A CPP spin-valve element formed on a substrate comprising:

a free layer structure including at least one ferromagnetic layer; and a pinned layer structure including at least one ferromagnetic layer, the free layer is magnetically softer than the pinned layer;

wherein at least one CC-layer structure is incorporated therein, which is configured to separate the free and pinned layer and to allow an electric current to go through the confined current paths, the width of at least one of the confined current paths of said at least one CC-layer structure is grater than $t^{3/2}$ where t is the thickness of at least one of said free layer structure and pinned layer measured in nano-meters.

11. The CPP spin-valve element of claim 10, wherein the width of at least one of the confined current paths of said CC-layer structure is greater than two times the $t^{3/2}$ where t is the thickness of at least one of said free layer structure and pinned layer measured in nano-meters.

12. The CPP spin-valve element of claim 11, wherein the average width of the confined current paths of said CC-layer structure is greater than two times $t^{3/2}$ where t is the thickness of at least one of said free layer structure and pinned layer measured in nano-meters.

13. The CPP spin-valve element of claim 10, wherein the average width of the confined current paths of said CC-layer structure is greater than $t^{3/2}$ where t is the thickness of at least one of said free layer structure and said pinned layer measured in nano-meters.

* * * * *